(12) United States Patent
Lin et al.

(10) Patent No.: US 10,484,972 B2
(45) Date of Patent: Nov. 19, 2019

(54) PUNCTURE RECOVERY AND RESOURCE RECLAIMING FOR MULTI-PRIORITY SCHEDULING

(71) Applicant: QUALCOMM Incorporated, San Diego, CA (US)

(72) Inventors: Jamie Menjay Lin, San Diego, CA (US); Hao Xu, Beijing (CN); Chong Li, Weehawken, NJ (US); Chih-Ping Li, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/788,740

(22) Filed: Oct. 19, 2017

(65) Prior Publication Data

US 2018/0115964 A1    Apr. 26, 2018

Related U.S. Application Data

(60) Provisional application No. 62/411,371, filed on Oct. 21, 2016.

(51) Int. Cl.
*H04W 72/04* (2009.01)
*H04W 72/12* (2009.01)
*H04W 28/02* (2009.01)

(52) U.S. Cl.
CPC ......... *H04W 72/04* (2013.01); *H04W 72/042* (2013.01); *H04W 72/12* (2013.01);
(Continued)

(58) Field of Classification Search
CPC ........... H04W 72/042; H04W 72/0446; H04W 72/1289; H04W 72/0453; H04W 72/1247;
(Continued)

(56) References Cited

U.S. PATENT DOCUMENTS

2014/0362832 A1* 12/2014 Rudolf ............... H04L 1/1822
370/336
2015/0334685 A1    11/2015 Ji et al.
(Continued)

FOREIGN PATENT DOCUMENTS

WO    WO-2017074537 A1 *  5/2017  ........... H04L 1/0068

OTHER PUBLICATIONS

Ericsson: "Puncturing sTTI in Legacy TTI", 3GPP Draft; R1-1610336, 3rd Generation Partnership Project (3gpp), Mobile Competence Centre, 650, Route Des Lucioles, F-06921 Sophia-Antipolis Cedex, France, vol. RAN WG1, No. Lisbon, Portugal; Sep. 30, 2016, XP051158687, Retrieved from the Internet: URL:http://www.3gpp.org/ftp/tsg_ran/WG1_RL1/TSGR1_86b/Docs/ [retrieved on Sep. 30, 2016], 5 pages.
(Continued)

*Primary Examiner* — Nizar N Sivji
(74) *Attorney, Agent, or Firm* — Holland & Hart LLP

(57) ABSTRACT

Various techniques provide for identifying and transmitting a first transmission to a UE in a first transmission time interval (TTI), and puncturing a portion of the first transmission with a higher priority second transmission that has a shorter TTI than the first TTI. The punctured portion of the first transmission may then be transmitted in a subsequent portion of the first TTI, concurrently with an originally allocated portion of the first transmission for that subsequent portion of the TTI. A UE may identify the punctured portion of the first transmission, and identify that the punctured portion of the first transmission is being transmitted in the subsequent portion of the first TTI. The UE may decode the received transmissions and merge the punctured portion with other, non-punctured, portions of the first transmission.

27 Claims, 19 Drawing Sheets

(52) U.S. Cl.
CPC .... *H04W 72/1242* (2013.01); *H04W 28/0205* (2013.01); *H04W 72/1289* (2013.01)

(58) Field of Classification Search
CPC ............... H04W 72/044; H04W 72/04; H04W 72/1257; H04W 28/04; H04L 5/0091; H04L 5/0044; H04L 1/0068; H04L 1/0069; H03M 13/6362
See application file for complete search history.

(56) References Cited

U.S. PATENT DOCUMENTS

| | | | | |
|---|---|---|---|---|
| 2015/0334702 | A1* | 11/2015 | Ji | H04W 72/1257 370/280 |
| 2015/0334729 | A1* | 11/2015 | Ji | H04W 72/0453 370/336 |
| 2016/0270116 | A1* | 9/2016 | Lin | H04W 72/1289 |
| 2016/0352481 | A1* | 12/2016 | Jiang | H04L 5/0048 |
| 2016/0374022 | A1* | 12/2016 | Ang | H04L 5/0007 |
| 2017/0223687 | A1* | 8/2017 | Kuchibhotla | H04W 72/044 |
| 2018/0288745 | A1* | 10/2018 | Davydov | H04W 72/042 |

OTHER PUBLICATIONS

International Search Report and Written Opinion—PCT/US2017/057603—ISA/EPO—dated Jan. 18, 2018.
Nokia et al., "Pause-Resume Scheduling for Low Latency Transmissions", 3GPP Draft; R1-1609749, 3rd Generation Partnership Project (3gpp), Mobile Competence Centre, 650, Route Des Lucioles, F-06921 Sophia-Antipolis Cedex, France, vol. RAN WG1, No. Lisbon, Portugal; Oct. 1, 2016, XP051159662, Retrieved from the Internet: URL:http://www.3gpp.org/ftp/tsg_ran/WG1_RL1/TSGR1_86b/Docs/ [retrieved on Oct. 1, 2016], 4 pages.

* cited by examiner

PUNCTURE RECOVERY AND RESOURCE RECLAIMING FOR MULTI-PRIORITY SCHEDULING

CROSS REFERENCES

The present Application for Patent claims priority to U.S. Provisional Patent Application No. 62/411,371 by LIN, et al., entitled "PUNCTURE RECOVERY AND RESOURCE RECLAIMING FOR MULTI-PRIORITY SCHEDULING," filed Oct. 21, 2016, assigned to the assignee hereof.

BACKGROUND

The following relates generally to wireless communication, and more specifically to puncture recovery and resource reclaiming for multi-priority scheduling.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

As communication providers continue to increase the capacity of wireless networks, and as demand for such capacity grows, efficient use of wireless resources becomes increasingly relevant for high quality and relatively low cost wireless communications. One technique used to enhance the efficiency of wireless networks is providing various different services that may have different throughput and latency requirements. Such different services may have different transmission numerologies, including different transmission time intervals (TTIs), based on the particular type of data to be transmitted using the different services. Further, such different services may have different transmission priorities, and in some cases a transmission of a higher priority service may puncture a transmission of a lower priority service. Efficient use of network resources in the presence of such multi-priority services may help to enhance overall network efficiency and enhance data throughput using network resources.

SUMMARY

The described techniques relate to improved methods, systems, devices, or apparatuses that support puncture recovery and resource reclaiming for multi-priority scheduling. Generally, the described techniques provide for identifying and transmitting a first transmission to a UE in a first transmission time interval (TTI), and puncturing a portion of the first transmission with a higher priority second transmission that has a shorter TTI than the first TTI. The punctured portion of the first transmission may then be transmitted in a subsequent portion of the first TTI, concurrently with an originally allocated portion of the first transmission for that subsequent portion of the TTI. A UE may identify the punctured portion of the first transmission, and identify that the punctured portion of the first transmission is being transmitted in the subsequent portion of the first TTI. The UE may decode the received transmissions and merge the punctured portion with other, non-punctured, portions of the first transmission.

A method of wireless communication is described. The method may include identifying a first service for transmission of first service data to a UE during a first transmission time interval (TTI), identifying a second service having a second TTI that is shorter than the first TTI for transmitting second service data, transmitting a first transmission of the first service to the UE during the first TTI, puncturing a first portion of the first transmission with a second transmission of the second service, a duration of the first portion corresponding to the second TTI, and transmitting the first portion of the first transmission to the UE during a subsequent portion of the first TTI.

An apparatus for wireless communication is described. The apparatus may include means for identifying a first service for transmission of first service data to a UE during a first TTI, means for identifying a second service having a second TTI that is shorter than the first TTI for transmitting second service data, means for transmitting a first transmission of the first service to the UE during the first TTI, means for puncturing a first portion of the first transmission with a second transmission of the second service, a duration of the first portion corresponding to the second TTI, and means for transmitting the first portion of the first transmission to the UE during a subsequent portion of the first TTI.

Another apparatus for wireless communication is described. The apparatus may include a processor, memory in electronic communication with the processor, and instructions stored in the memory. The instructions may be operable to cause the processor to identify a first service for transmission of first service data to a UE during a first TTI, identify a second service having a second TTI that is shorter than the first TTI for transmitting second service data, transmit a first transmission of the first service to the UE during the first TTI, puncture a first portion of the first transmission with a second transmission of the second service, a duration of the first portion corresponding to the second TTI, and transmit the first portion of the first transmission to the UE during a subsequent portion of the first TTI.

A non-transitory computer readable medium for wireless communication is described. The non-transitory computer-readable medium may include instructions operable to cause a processor to identify a first service for transmission of first service data to a UE during a first TTI, identify a second service having a second TTI that is shorter than the first TTI for transmitting second service data, transmit a first transmission of the first service to the UE during the first TTI, puncture a first portion of the first transmission with a second transmission of the second service, a duration of the first portion corresponding to the second TTI, and transmit the first portion of the first transmission to the UE during a subsequent portion of the first TTI.

Some examples of the method, apparatus, and non-transitory computer-readable medium described above may further include processes, features, means, or instructions for signaling to the UE, during the subsequent portion of the first TTI, that the first portion of the first transmission is being transmitted. In some examples of the method, apparatus, and non-transitory computer-readable medium described above, the signaling comprises a SPI channel transmission to the UE that indicates to the UE that the first portion of the first transmission is being transmitted in the subsequent portion of the first TTI.

In some examples of the method, apparatus, and non-transitory computer-readable medium described above, the first portion of the first TTI may be transmitted during the subsequent portion of the first TTI concurrently with a second portion of the first transmission that is transmitted in the subsequent portion of the first TTI. In some examples of the method, apparatus, and non-transitory computer-readable medium described above, the SPI channel transmission comprises a temporary identifier that may be transmitted in an assigned resource of the first transmission to the UE and in a second resource originally unallocated to the UE. Some examples of the method, apparatus, and non-transitory computer-readable medium described above may further include processes, features, means, or instructions for configuring the UE to monitor the second resource when a transmission may be punctured. In some examples of the method, apparatus, and non-transitory computer-readable medium described above, the SPI channel transmission comprises an identifier selected from a pre-defined set of SPI values and indicated to the UE on the SPI channel.

In some examples of the method, apparatus, and non-transitory computer-readable medium described above, the signaling comprises an identifier of the first service in an assigned resource of the first transmission to the UE and in a second resource originally unallocated to the UE or an indication in downlink control information (DCI) provided to the UE that the first portion of the first transmission that was punctured may be being transmitted to the UE in the second resource.

Some examples of the method, apparatus, and non-transitory computer-readable medium described above may further include processes, features, means, or instructions for determining whether a second resource originally unallocated to the UE is available for transmitting the first portion of the first transmission to the UE during the subsequent portion of the first TTI, and the transmitting the first portion of the first transmission to the UE during the subsequent portion of the first TTI may be performed responsive to determining that the second resource may be available for transmitting the first portion of the first transmission during the subsequent portion of the first TTI.

Some examples of the method, apparatus, and non-transitory computer-readable medium described above may further include processes, features, means, or instructions for reserving a set of resources for transmission of punctured portions of transmissions of the first service, and wherein the first portion of the first transmission may be transmitted using a subset of the reserved set of resources during the subsequent portion of the first TTI. In some examples of the method, apparatus, and non-transitory computer-readable medium described above, the reserving may be performed based at least in part on one or more of a buffer status for data transmissions of the first service, a number of UEs scheduled for transmissions during the first TTI, a likelihood of puncturing of the first service, or any combination thereof. Some examples of the method, apparatus, and non-transitory computer-readable medium described above may further include processes, features, means, or instructions for configuring the UE to buffer transmissions in the reserved set of resources, transmitting a redundant transmission of a second portion of the first transmission using the reserved set of resources during the second portion of the first transmission, and providing an indication to the UE that the redundant transmission may be to be used as a redundancy version of the second portion of the first transmission transmitted using originally allocated resources of the first transmission.

A method of wireless communication is described. The method may include receiving, from a base station, a downlink allocation for a first service during a first TTI, determining that a priority indication channel is to be monitored on a periodic basis that corresponds to a second TTI duration of a second service, the second TTI duration being shorter than the first TTI, receiving a first transmission of the first service during the first TTI, determining that the priority indication channel indicates that the first transmission is being punctured by a second transmission of the second service, a first punctured portion of the first TTI having a duration corresponding to the second TTI duration, discarding transmissions received during the first punctured portion of the first TTI, and receiving the first punctured portion of the first transmission during a subsequent portion of the first TTI.

An apparatus for wireless communication is described. The apparatus may include means for receiving, from a base station, a downlink allocation for a first service during a first TTI, means for determining that a priority indication channel is to be monitored on a periodic basis that corresponds to a second TTI duration of a second service, the second TTI duration being shorter than the first TTI, means for receiving a first transmission of the first service during the first TTI, means for determining that the priority indication channel indicates that the first transmission is being punctured by a second transmission of the second service, a first punctured portion of the first TTI having a duration corresponding to the second TTI duration, means for discarding transmissions received during the first punctured portion of the first TTI, and means for receiving the first punctured portion of the first transmission during a subsequent portion of the first TTI.

Another apparatus for wireless communication is described. The apparatus may include a processor, memory in electronic communication with the processor, and instructions stored in the memory. The instructions may be operable to cause the processor to receive, from a base station, a downlink allocation for a first service during a first TTI, determine that a priority indication channel is to be monitored on a periodic basis that corresponds to a second TTI duration of a second service, the second TTI duration being shorter than the first TTI, receive a first transmission of the first service during the first TTI, determine that the priority indication channel indicates that the first transmission is being punctured by a second transmission of the second service, a first punctured portion of the first TTI having a duration corresponding to the second TTI duration, discard transmissions received during the first punctured portion of the first TTI, and receive the first punctured portion of the first transmission during a subsequent portion of the first TTI.

A non-transitory computer readable medium for wireless communication is described. The non-transitory computer-readable medium may include instructions operable to cause a processor to receive, from a base station, a downlink allocation for a first service during a first TTI, determine that a priority indication channel is to be monitored on a periodic basis that corresponds to a second TTI duration of a second service, the second TTI duration being shorter than the first TTI, receive a first transmission of the first service during the first TTI, determine that the priority indication channel indicates that the first transmission is being punctured by a second transmission of the second service, a first punctured portion of the first TTI having a duration corresponding to the second TTI duration, discard transmissions received during the first punctured portion of the first TTI, and receive the first punctured portion of the first transmission during a subsequent portion of the first TTI.

In some examples of the method, apparatus, and non-transitory computer-readable medium described above, the receiving the first punctured portion of the first transmission during the subsequent portion of the first TTI comprises receiving signaling, during the subsequent portion of the first TTI, that indicates the first punctured portion of the first transmission may be being transmitted. In some examples of the method, apparatus, and non-transitory computer-readable medium described above, the signaling comprises a SPI channel transmission that indicates that the first punctured portion of the first transmission may be being transmitted in the subsequent portion of the first TTI. In some examples of the method, apparatus, and non-transitory computer-readable medium described above, the first punctured portion of the first transmission may be received during the subsequent portion of the first TTI concurrently with a second portion of the first transmission that may be received in the subsequent portion of the first TTI. In some examples of the method, apparatus, and non-transitory computer-readable medium described above, the SPI channel transmission comprises a temporary identifier that may be received in an assigned resource of the first transmission and in a second resource that was previously unallocated for the first transmission. Some examples of the method, apparatus, and non-transitory computer-readable medium described above may further include processes, features, means, or instructions for receiving a configuration to monitor the second resource when a transmission may be punctured.

In some examples of the method, apparatus, and non-transitory computer-readable medium described above, the SPI channel transmission includes an identifier selected from a pre-defined set of SPI values and indicated to the UE on the SPI channel. In some examples of the method, apparatus, and non-transitory computer-readable medium described above, the signaling comprises: an identifier of the first service in an allocated resource of the first transmission and in a second unallocated resource, or an indication in downlink control information (DCI) that the first punctured portion of the first transmission may be being transmitted in the second unallocated resource.

Some examples of the method, apparatus, and non-transitory computer-readable medium described above may further include processes, features, means, or instructions for receiving an identification of a reserved set of resources for transmission of punctured portions of transmissions of the first service, and wherein the first punctured portion of the first transmission may be received using a subset of the reserved set of resources during the subsequent portion of the first TTI concurrently with a second portion of the first transmission that may be received using first TTI resources previously allocated to the UE in the subsequent portion of the first TTI.

Some examples of the method, apparatus, and non-transitory computer-readable medium described above may further include processes, features, means, or instructions for buffering transmissions in the reserved set of resources, receiving an indication that the second portion of the first transmission transmitted using the reserved set of resources is to be used as a redundancy version of the second portion of the first transmission transmitted using originally allocated resources of the first transmission, and decoding the second portion of the first transmission based on a received transmission in the originally allocated resources and the redundancy version of the second portion of the first transmission received in the reserved set of resources.

DETAILED DESCRIPTION

Figure 1:
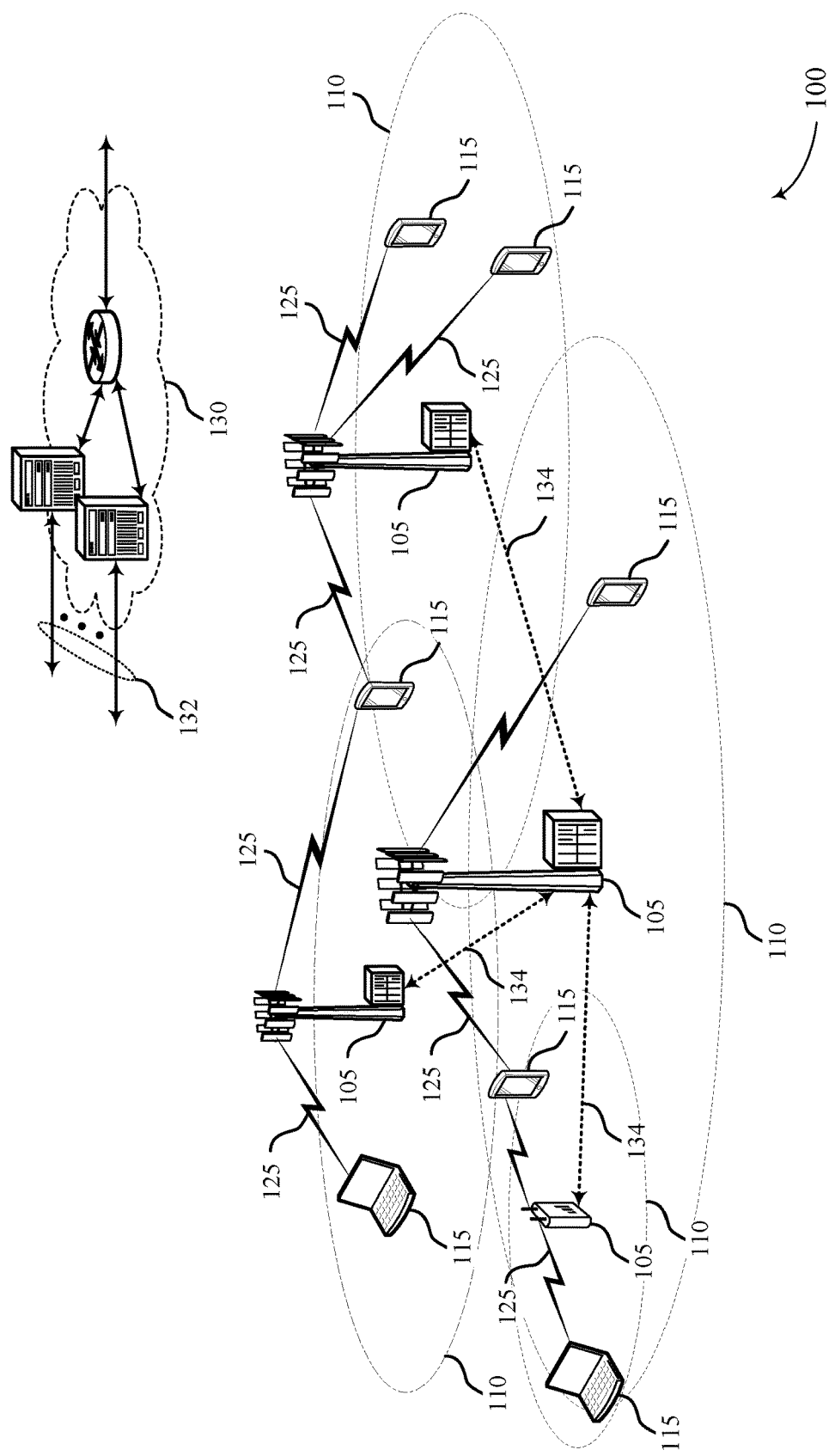
FIG. 1 illustrates an example of a system for wireless communication that supports puncture recovery and resource reclaiming for multi-priority scheduling in accordance with aspects of the present disclosure.

Techniques are described that provide for puncture recovery and resource reclaiming for multi-priority scheduling. In cases where a lower priority transmission is punctured by a higher priority transmission within a TTI of the lower priority transmission, an intra-TTI recovery (ITR) transmission may be transmitted for the lower priority service that may allow a receiver recover the punctured portion of the transmission. In such cases, retransmissions of the lower priority transmissions may be avoided and network efficiency enhanced.

In some examples, a base station may identify and transmit a first transmission to a UE in a first TTI, and puncture a portion of the first transmission with a higher priority second transmission that has a shorter TTI than the first TTI. The punctured portion of the first transmission may then be transmitted in a subsequent portion of the first TTI, concurrently with an originally allocated portion of the first transmission for that subsequent portion of the TTI. A UE may identify the punctured portion of the first transmission, and identify that the punctured portion of the first transmission is being transmitted in the subsequent portion of the first TTI. In some cases, a UE may monitor for a scheduled priority indicator (SPI) periodically based on a TTI of the second transmission, and may identify that the first transmission is punctured based on the monitored SPI. The UE may also monitor for an SPI that indicates that the punctured portion of the first transmission is being transmitted in other resources of the first TTI concurrently with previously allocated transmissions of the first transmission. The UE may decode the received transmissions and merge the punctured portion with other, non-punctured portions of the first transmission. Thus, the first transmission may be received in the first TTI and a retransmission of the first transmission due to the puncturing may be avoided.

As indicated above, in some cases different services may be selected for data communications depending upon the nature of the communications. For example, communications that require low latency and high reliability, sometimes referred to as mission critical (MiCr) communications, may be served through a lower-latency service (e.g., an ultra-reliable low-latency communication (URLLC) service). Correspondingly, communications that are more delay-tolerant may be served through a service that provides relatively higher throughput with somewhat higher latency, such as a mobile broadband service (e.g., an enhanced mobile broadband (eMBB) service). In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

Additionally, services at various priority levels or round trip time (RTT) latencies may be multiplexed over time and/or over sub-carrier resources. Multi-priority scheduling may result in a particular receiver or UE being conflicted with (or punctured by) a higher-priority transmission within a TTI. A UE with a punctured TTI in the absence of puncture recovery techniques such as discussed herein may be subject to elevated data error rates for the first transmissions and re-transmissions. For example, a UE relying on hybrid automatic repeat request (HARQ) re-transmissions may have a resulting higher average RTT, which may have a negative impact on delay-sensitive services such as VoIP. Further, in some cases UEs may rely on outer-loop target rate control for elevated error rate, and may also add unnecessary interference to serving or neighboring cells or users, as such puncturing is bursty/random in nature and consistently applying increased allocation or transmit power in order to meet a target rate may not utilize accurate knowledge of the puncturing occurrence. As indicated above, ITR techniques as discussed herein may provide techniques to timely and accurately neutralize bursty puncturing impacts on error rate and latency, before needing to resort to HARQ re-transmission and outer-loop target rate control mechanisms, which may thereby enhance the overall efficiency of a wireless network and provide efficient use of wireless resources available to such a wireless network.

The present disclosure describes various techniques with reference to next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which different services that have different TTIs and different priority services in which certain transmissions may be punctured by other higher priority transmissions.

Aspects of the disclosure are initially described in the context of a wireless communications system. Aspects of the disclosure are further illustrated by and described with reference to apparatus diagrams, system diagrams, and flowcharts that relate to puncture recovery and resource reclaiming for multi-priority scheduling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. The wireless communications system 100 may provide for puncture recovery and resource reclaiming in cases where multi-priority scheduling may result in punctured transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. D2D communications may utilize techniques as disclosed herein for puncture recovery and resource reclaiming in multi-priority scheduling.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-*b* may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

The core network 130 may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
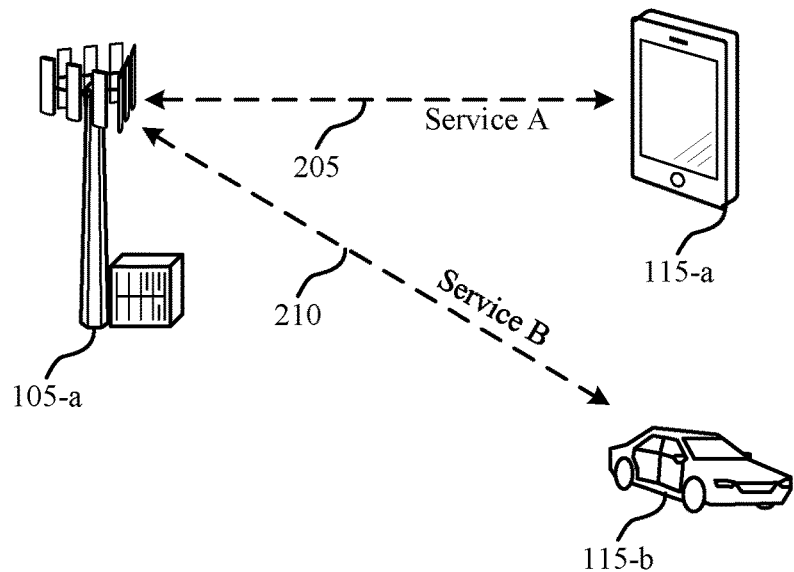
FIG. 2 illustrates an example of a portion of a wireless communication system that supports puncture recovery and resource reclaiming for multi-priority scheduling in accordance with aspects of the present disclosure.

FIG. 2 illustrates an example of a portion of a wireless communication system 200 for puncture recovery and resource reclaiming for multi-priority scheduling, in accordance with aspects of the present disclosure. Wireless communication system 200 may include a base station 105-a, a first UE 115-a and a second UE 115-b, which may be examples of the corresponding devices described with reference to FIG. 1. In the example of FIG. 2, the base station 105-a may establish a first connection 205 with the UE 115-a, and a second connection 210 with a UE 115-b that may be incorporated in a vehicle in this example. In the example of FIG. 2, the wireless communication system 200 may operate according to a radio access technology (RAT) such as a 5G or NR RAT, although techniques described herein may be applied to any RAT and to systems that may concurrently use two or more different RATs.

As indicated above, in some examples the wireless communication system 200 may be a portion of a NR or 5G network. Based on growing demand for data and throughput anticipated for 5G, efficient use of RF spectrum may be necessary to support communications. Such efficient use may include multi-priority scheduling, as discussed herein. For example, in some deployments, as indicated above, a 5G or NR network may support multiple types of services, such as eMBB, URLLC, mMTC, etc., that may use different transmission priorities, different TTIs, and that may puncture transmissions of lower priority services. For example, first UE 115-a may be scheduled with service A over first connection 205. Service A may be a relatively latency-insensitive service, such as an eMBB service, for example. The second UE 115-b may be scheduled with service B over the second connection 210, and service B may require low latency and high reliability, and may have a shorter TTI than service A. In cases where a first transmission may be scheduled for the first UE 115-a, and the base station 105-a may identify a higher priority second transmission for service B to be transmitted to the second UE 115-b, the first transmission may be punctured. As discussed above, in some examples the base station 105-a may (re)transmit the punctured portion of the first transmission within the same TTI, allowing the first UE 115-a to receive the unpunctured portions of the first transmission as well as the punctured portion, which may be merged together and decoded. In the event that the decoding of the first transmission is successful, a retransmission of the first transmission may be avoided.

Figure 3:
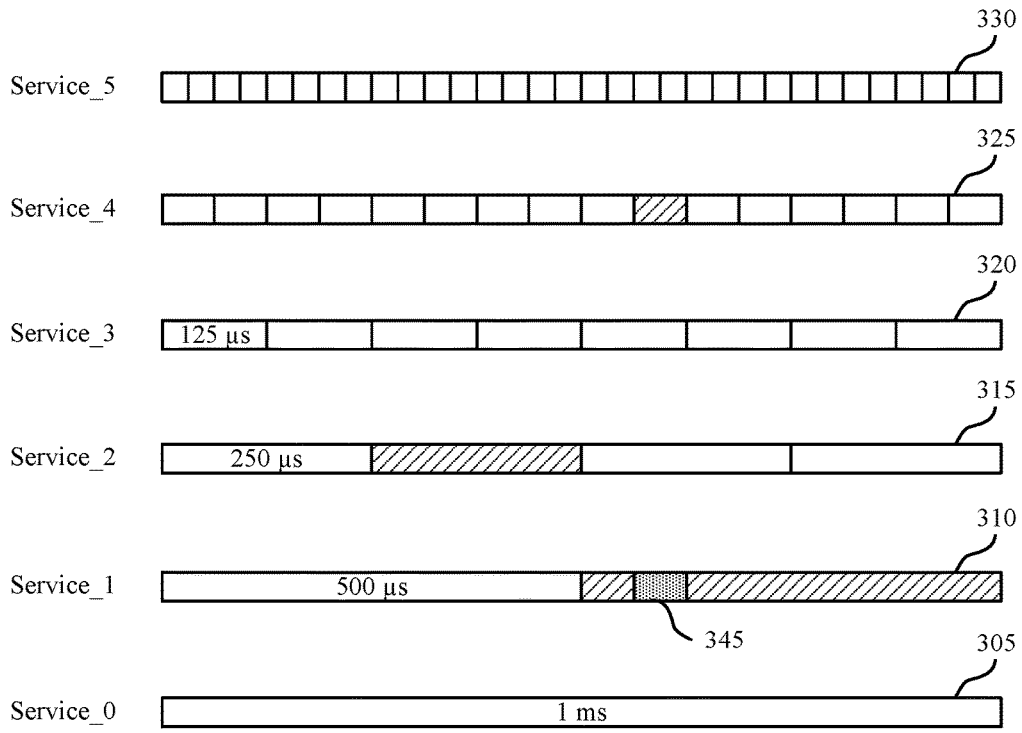
FIG. 3 illustrates an example of multi-priority services and puncturing of a lower priority service transmission in accordance with aspects of the present disclosure.
Figure 3:
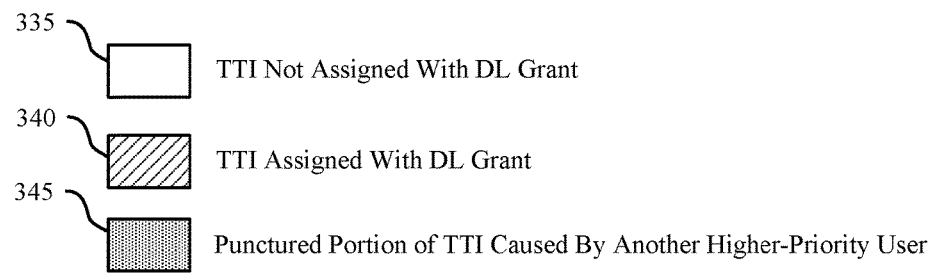

FIG. 3 illustrates an example of a wireless resources 300 illustrating multi-priority services and puncturing of a lower priority service transmission, in accordance with aspects of the present disclosure. Wireless resources 300 may be used for communications between UEs 115 and base stations 105 such as discussed above with respect to FIGS. 1 and 2.

In the example of FIG. 3, multiple services may be scheduled for different users. For example, service_0 305 may be a lowest priority service and may have a 1 ms TTI, with remaining higher priority services having progressively shorter TTIs. In this example, service_1 310 may have a 500 μs TTI, service_2 315 may have a 250 μs TTI, service_3 may have a 125 μs TTI, service_4 may have a 62.5 μs TTI, and service_5 may have a 31.25 μs TTI. Certain services may be scheduled according to particular needs within a TTI, and in the example of FIG. 3 a number of TTIs 335 may not be assigned with a downlink grant, and a number of other TTIs 340 of different services may be scheduled with downlink grants. In this example, service_1 310 may be assigned a downlink grant in a second TTI, service_2 315 may be assigned a downlink grant in a TTI that is non-overlapping with the transmission of service_1 310, and service_4 325 may be assigned a downlink grant that does overlap with the transmission of service_1 310, creating a punctured portion 345 of the transmission of service_1 310.

In some cases, a serving base station may identify a service that is being transmitted through an indication of the service, such as a scheduled priority indicator (SPI) that may be transmitted in a common priority indication channel, or SPI channel, once for each TTI of the shortest-TTI service (TTI_min) that is currently being served by the base station. A UE may be configured to monitor for an SPI each TTI_min, and may determine that a transmission is punctured when the SPI does not match the service of a transmission being received by the UE. In such cases, a UE may discard or ignore transmissions received during the punctured portion of a transmission. As discussed above, in some cases a base station may determine that resources are available for an ITR transmission that may be used to recover the punctured portion of the transmission and may transmit the ITR transmission using such resources, as will be discussed in more detail with respect to the example of FIG. 4.

Figure 4:
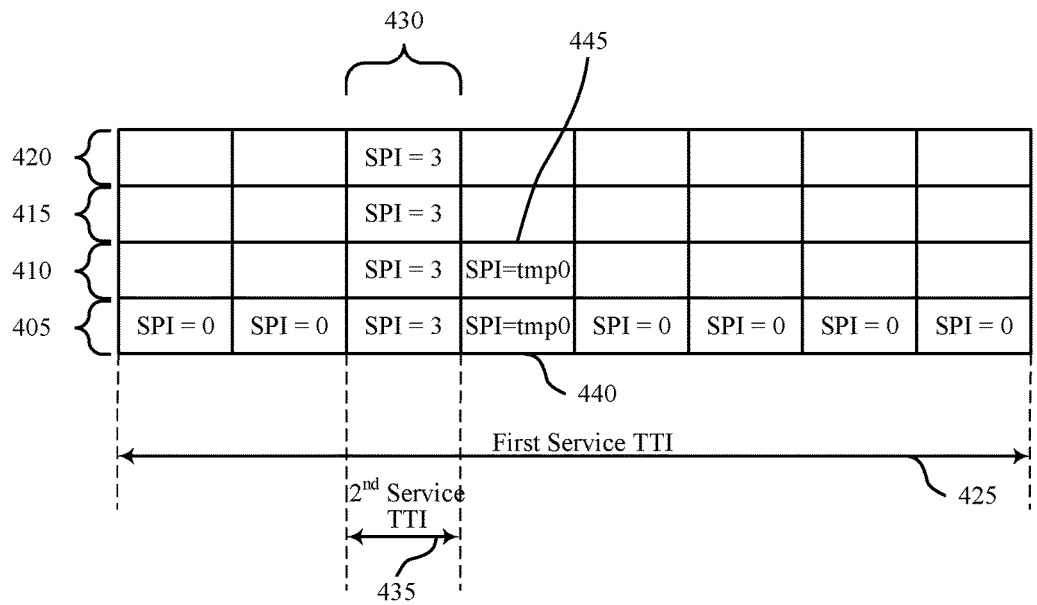
FIG. 4 illustrates an example of wireless resources that support puncture recovery and resource reclaiming for multi-priority scheduling in accordance with aspects of the present disclosure.

FIG. 4 illustrates an example of wireless resources 400 that support puncture recovery and resource reclaiming for multi-priority scheduling in accordance with aspects of the present disclosure. Wireless resources 400 may be used for communications between UEs 115 and base stations 105 such as discussed above with respect to FIGS. 1 and 2. Wireless resources 400 may include a number of wireless channels that may have an associated bandwidth (e.g., 4 20 MHz channels). In this example, wireless resources 400 include a first channel 405, a second channel 410, a third channel 415, and a fourth channel 420.

In the example of FIG. 4, a UE may be scheduled for a first transmission using first channel 405 of a first service, which may have an SPI of 0, that spans a first service TTI 425. A second UE may be scheduled for a second transmission 430 of a second service, which may have an SPI of 3, that spans a second service TTI 435 and may occupy the first through fourth channels 405 through 420. In this example, the second service TTI 435 is a fraction of the first service TTI 425, and the second service has a higher priority than the first service. Thus, a portion of the first transmission corresponding to the second service TTI 435 is punctured. As mentioned above, the base station may configure the first UE to monitor for SPI indicators once every TTI_min, which in this case may correspond to the second service TTI 435. Thus, the first UE may identify an SPI value of 3 in the punctured portion of the first transmission.

In this example, the base station may identify the punctured portion of the first transmission, and may initiate an ITR transmission to allow the first UE to recover the punctured portion. In this example, after the puncturing, a unique temporary ITR SPI is assigned to the first UE, which is SPI tmp0. The base station may include this unique temporary ITR SPI in the originally assigned resources 440 of a subsequent portion of the first transmission. As this resource is assigned to the first UE, the unique temporary ITR SPI may be identified by the first UE as belonging to it, and may monitor other channels 410 through 420 for ITR transmissions. In this example, an ITR transmission 445 is transmitted on second channel 410 and includes the unique temporary ITR SPI. The first UE may detect all instances of the temporary ITR SPI indicated in the allocation space and learns all the original and ITR assignments in a TTI_min. These transmissions may be merged at the UE to recover the full first transmission, and decoding of the first transmission may be performed.

According to some examples, a base station performing multi-priority scheduling may perform ITR on punctured transmissions. In some cases, the base station may assign an SPI of "SPI_user" (which uniquely corresponds to a TTI_user) to an active user. Following a puncturing event, if another resource is available, the base station may signal a priority update on a common indication channel or SPI channel, to indicate ITR resources assigned to the punctured UE in order to fully or partially recover the punctured signal, within the same TTI as the punctured transmission. Thus the base station may opportunistically perform ITR when resources are available. If for any reason the base station does not execute ITR in a TTI for a UE, the base station simply does not signal the priority update on the common channel in the TTI, and the UE may use HARQ processes to recover the punctured transmission.

Correspondingly, a UE operating in such a multi-priority scheduling may identify a punctured transmission and monitor for ITR transmissions. As mentioned above, the UE may be configured to monitor the common priority indication channel or SPI channel once every TTI_min when it has an on-going downlink assignment. After being punctured and before the punctured portion(s) of a transmission are fully recovered, the UE may try to detect "SPI_user" once every TTI_min to see whether the network tries to schedule ITR within the same TTI of the first transmission. If a matching "SPI_user" is detected on the common or SPI channel after puncturing, and the UE confirms the identity of ITR assignment, the UE may receive the signal as assigned by the ITR resources and may merge the signal with other received (non-punctured) signal in current TTI for decoding or buffering.

Various alternatives may be used to identify a UE in an ITR transmission. In the above examples, a unique temporary ITR SPI may be provided for a punctured UE. In such cases, the base station may pre-define a set of SPI values, known to all users, as temporary ITR SPIs. After puncturing, the base station may pick an unused temporary ITR SPI and uniquely assigns it to the victim UE, and indicate such unique temporary ITR SPI in the original assignment space (e.g., resource blocks) on the common priority indication or SPI channel. The RB ordering (based on RB index) of the ITR assignment is according to the RB ordering in the punctured portion. After the punctured TTI, the base station may reclaim this temporary ITR SPI back to an unused temporary ITR SPI. The receiving UE, in such examples, after puncturing may detect the unique temporary ITR SPI in its original assignment space, and use the detected ITR SPI as its newly assigned temporary ITR SPI. The UE may then use this temporary ITR SPI to detect for possible ITR assignment in other allocation spaces. Any RB resource in the allocation space indicated with this temporary ITR SPI is recognized by the UE as an ITR assignment to the UE.

In other examples, if there is only one active UE for a particular service priority, the UE may be assigned "SPI_user." Such "SPI_user" value may be signaled on the common priority indication or SPI channel, and is sufficient to uniquely identify the intended UE and to allocate for the ITR assignment. If there are multiple active UEs of a same priority as "SPI_user", the base station and UE may identify the assigned ITR resources through (dedicated) downlink control information (DCI). Other examples for UE identification may be used in other examples, with the above examples being provided for purposes of illustration and discussion. Furthermore, while various examples describe techniques with respect to downlink transmissions that may be punctured, such techniques may also be used in uplink transmissions.

Figure 5:
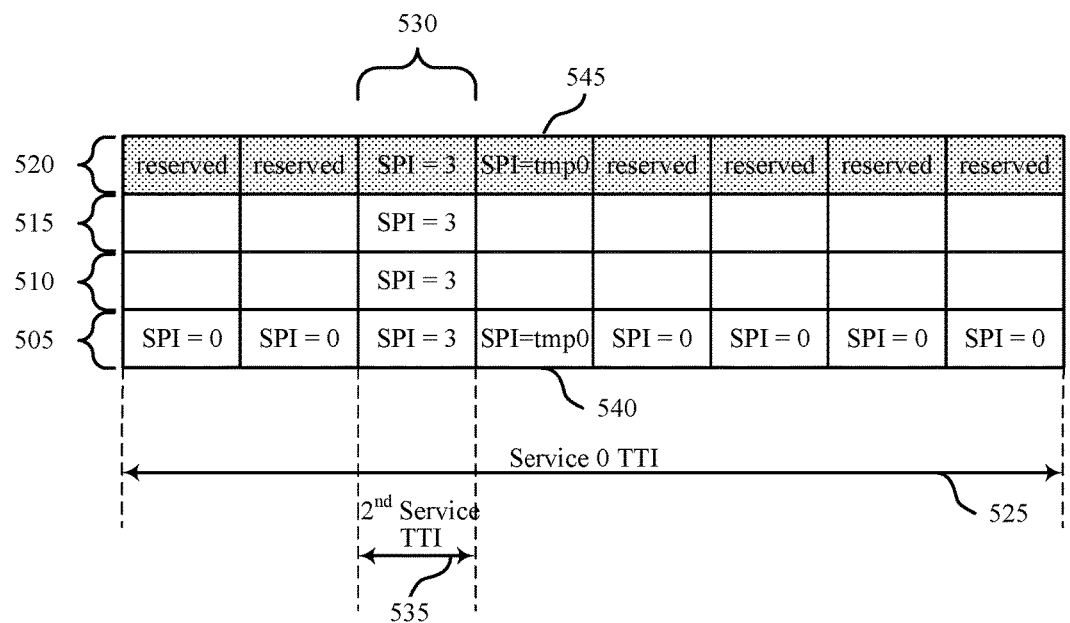
FIG. 5 illustrates another example of wireless resources that support puncture recovery and resource reclaiming for multi-priority scheduling in accordance with aspects of the present disclosure.

As mentioned above, a base station may opportunistically transmit ITR transmissions to recover punctured transmissions. In some cases, a base station may reserve a subset of resources for such ITR transmissions. FIG. 5 illustrates another example of wireless resources 500 that support puncture recovery and resource reclaiming for multi-priority scheduling in accordance with aspects of the present disclosure. Wireless resources 500 may be used for communications between UEs 115 and base stations 105 such as discussed above with respect to FIGS. 1 and 2. Similarly as with FIG. 4, wireless resources 500 may include a number of wireless channels that may have an associated bandwidth (e.g., 4 20MHz channels). In this example, wireless resources 500 include a first channel 505, a second channel 510, a third channel 515, and a fourth channel 520.

In the example of FIG. 5, a UE may again be scheduled for a first transmission using first channel 505 of a first service, which may have an SPI of 0, that spans a first service TTI 525. A second UE may be scheduled for a second transmission 530 of a second service, which may have an SPI of 3, that spans a second service TTI 535 and may occupy the first through fourth channels 505 through 520. In this example, the second service TTI 535 is a fraction of the first service TTI 525, and the second service has a higher priority than the first service. Thus, a portion of the first transmission corresponding to the second service TTI 535 is punctured. In this example, the base station may reserve resources of fourth channel 520 for potential ITR transmissions. The base station may configure the first UE to monitor for SPI indicators once every TTI_min, which in this case may correspond to the second service TTI 535. Thus, the first UE may identify an SPI value of 3 in the punctured portion of the first transmission.

In this example, the base station may identify the punctured portion of the first transmission, and may initiate an ITR transmission to allow the first UE to recover the punctured portion. In this example, after the puncturing, a unique temporary ITR SPI is assigned to the first UE, which is SPI tmp0. The base station may include this unique temporary ITR SPI in the originally assigned resources 540 of a subsequent portion of the first transmission. As this resource is assigned to the first UE, the unique temporary ITR SPI may be identified by the first UE as belonging to it, and may monitor the reserved resources of fourth channel 520 for ITR transmissions. In this example, an ITR transmission 545 is transmitted using the reserved resources on fourth channel 520 and includes the unique temporary ITR SPI. The first UE may detect all instances of the temporary ITR SPI and learn all the original and ITR assignments in a TTI_min. These transmissions may be merged at the UE to recover the full first transmission, and decoding of the first transmission may be performed.

Thus, a reserved and reclaimable resource area may be provided for ITR transmissions. In some cases, the base station may allocate a subset of the system resource based on system parameters (e.g., buffer status, loads, likelihood for eMBB user puncturing, etc.) for the use of ITR and resource reclaiming. Whenever there is a reserved resource available, the base station may schedule at higher priority for URLLC users for the use of resources in that reserved area. In some examples, reserved resources unused by higher-priority users through ITR may also be "reclaimed" for eMBB users to gain additional redundancy. Further, in some examples lower priority UEs may be configured to buffer the received signal located in the reserved resources, and use them for additional redundancy for decoding, according to network indication(s) for how contents in that area may be used.

ITR transmissions according to various techniques such as disclosed herein may provide a number of benefits. For example, such transmission may provide for timely recovering of punctured transmissions, and a lost (punctured) signal may recovered right within same frame or TTI in cases where another resource is available within the frame or TTI for ITR transmission. Thus, there is no need to wait for an HARQ feedback transmission on the uplink and for a future downlink re-transmission of the punctured TTI. Such transmissions may also provide for efficient use of RB resources. ITR transmission may recover only the punctured portion of the TTI, and thus there is no need to re-transmit the entire TTI of data. Additionally, ITR techniques may not consume more RB resources over time than other techniques, such as code block (CB) level HARQ. ITR transmissions may also provide a reduction on extra latency that may be caused by bursty puncturing. Bursty puncturing increases data error rates on first transmission and re-transmissions, which add to overall latency, and ITR reduces such extra HARQ re-transmissions, which is particularly helpful for delay-sensitive services such as VoIP. ITR transmission may also provide reduction on extra interference caused by bursty puncturing. Bursty puncturing increases data error rate and may in turn drive up allocation or transmission power through outer-loop target rate control. ITR neutralizes bursty puncturing impacts by lowering data error rate, which in turn helps avoid/reduce such elevated interference against other cells/users.

In one specific example of effects on error rate and latency, assume the network originally operates at 10% Block Error Ratio (BLER) target in first data transmission for UE-A without bursty puncturing. With new activities of other higher-priority users in the network, UE-A data BLER rises from 10% to 20% for its first transmission. Using ITR, UE-A may be able to continue at 10% BLER for first transmission, as punctured signals are recovered in time, without having to undergo elevated BLER, which may in turn have caused unnecessary HARQ re-transmissions. Overall round-trip time (RTT) latency may also remain unaffected.

Figure 6:
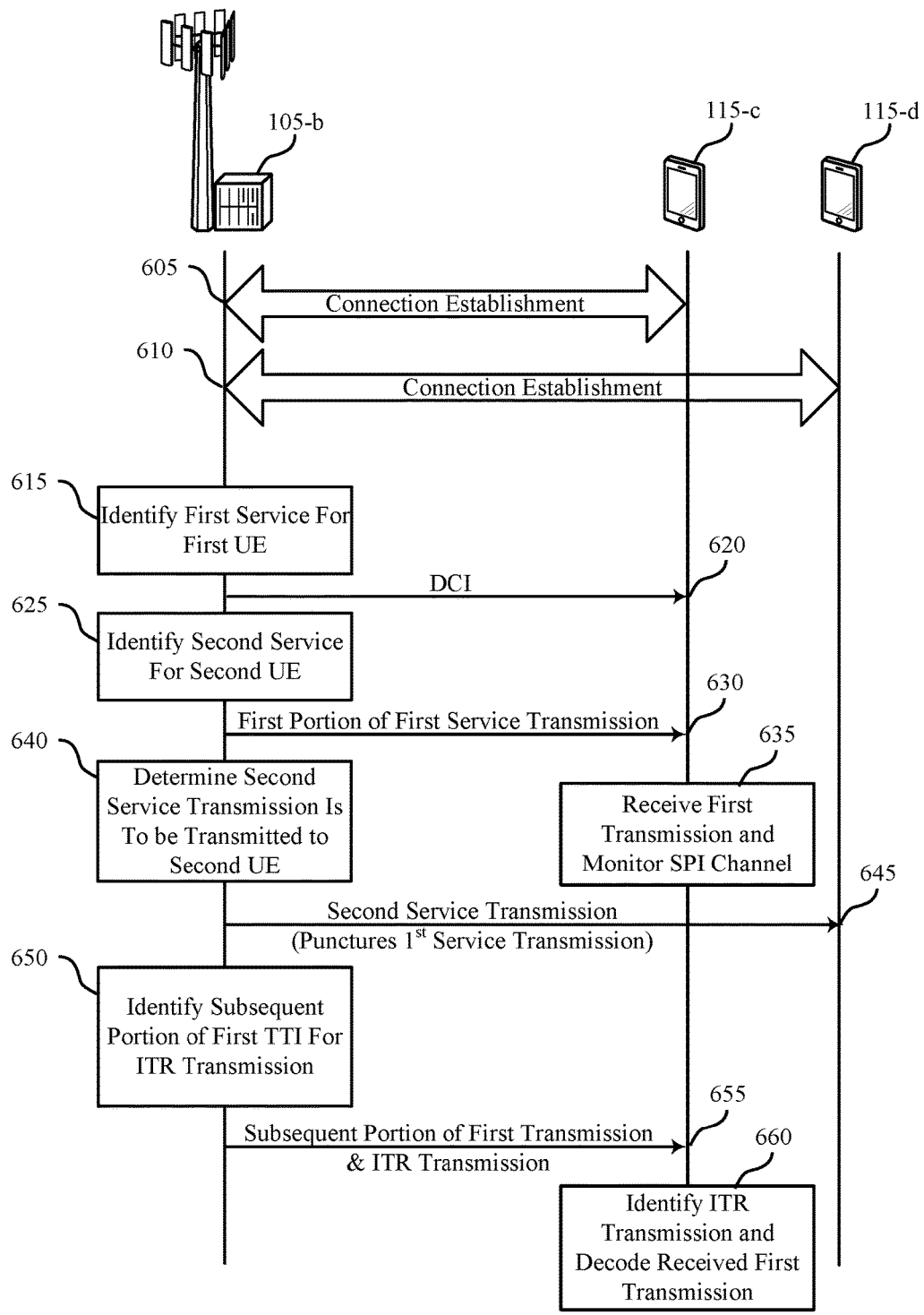
FIG. 6 illustrates an example of a process flow that supports puncture recovery and resource reclaiming for multi-priority scheduling in accordance with aspects of the present disclosure.

FIG. 6 illustrates an example of a process flow 600 for puncture recovery and resource reclaiming for multi-priority scheduling. Process flow 600 may include base station 105-*b*, a first UE 115-*c*, and a second UE 115-*d*, which may be examples of the corresponding devices described with reference to FIG. 1-2. The base station 105-*b* and the first UE 115-*c* may establish a connection 605 according to established connection establishment techniques. The base station 105-*b* and the second UE 115-*d* also may establish a connection 610 according to established connection establishment techniques. First UE 115-*c* may have lower priority service than second UE 115-*d*, and thus may be subject to having its transmissions punctured by the higher priority transmissions of the second UE 115-*d*.

At block 615, the base station 105-*b* may identify a first service for the first UE 115-*c*. Base station 105-*b* may transmit DCI 620 to the first UE 115-*c* that may indicate a downlink resource allocation for a subsequent downlink transmission to the first UE 115-*c*. In some examples, the DCI may also include information on a reserved set of resources and may indicate that the first UE 115-*c* is to buffer transmissions on the reserved set of resources for potential use as redundant transmissions to the transmissions on the allocated downlink resources. In some examples, the DCI 620 may also indicate a TTI_min at which the first UE 115-*c* is to monitor for SPI indications.

At block 625, the base station 105-*b* may identify a second service for the second UE 115-*d*. As indicated above, in some examples the second service may be a higher priority service than the first service, such as a URLLC service, for example. The base station 105-*b* may transmit a first portion of the first transmission 630 to the first UE 115-*c*.

At block 635 the first UE 115-*c* may receive the first portion of the first transmission, and also may monitor the SPI channel (e.g., every TTI_min). The UE 115-*c* may buffer the received first portion of the first transmission for combining and decoding with other portions of the first transmission. In some examples, the UE 115-*c* may also buffer receptions on a reserved set of resources for potential redundancy versions of the first transmission.

At block 640, the base station 105-*b* may determine that a second service transmission is to be transmitted to second UE. As indicated above, the second service may be a higher priority service than the first service, and may have a shorter TTI than the first service TTI. The base station 105-*b* may transmit the second service transmission 645 to the second UE 115-*d* that punctures the first service transmission. The base station 105-*b* may, as part of the second service transmission 645, include a SPI associated with the second service that the first UE 115-*c* may use to identify that the first transmission has been punctured.

At block 650, the base station 105-*b* may identify a subsequent portion of the first TTI for ITR transmission of the punctured portion of the first transmission. Such an identification may be based on, for example, available resources within the first TTI. In other examples, the identification may identify a subset of a set of reserved resources for ITR transmissions. The base station 105-*b* may transmit the subsequent portion of the first transmission and the ITR transmission 655 in the subsequent portion of the first TTI.

At block 660, the first UE 115-c may identify the ITR transmission and decode the received first transmission. In some examples, the first UE 115-c may identify the ITR transmission based on an SPI indicator that may be transmitted in the previously allocated resources as well as in other resources that may be monitored by the first UE 115-c. In other examples, the first UE 115-c may identify the ITR transmission based on a unique SPI indicator allocated to the first UE 115-c that may be transmitted in the previously allocated resources as well as in other resources that may be monitored by the first UE 115-c. In other examples, the first UE 115-c may be signaled in the DCI 620 resources that may be monitored for ITR transmissions. The first UE 115-c may decode the received first transmission, including the portions of the first transmission received in the allocated resources as well as any ITR transmissions, and reorder RBs within the first transmission according to RB ordering to obtain the complete first transmission.

Figure 7:
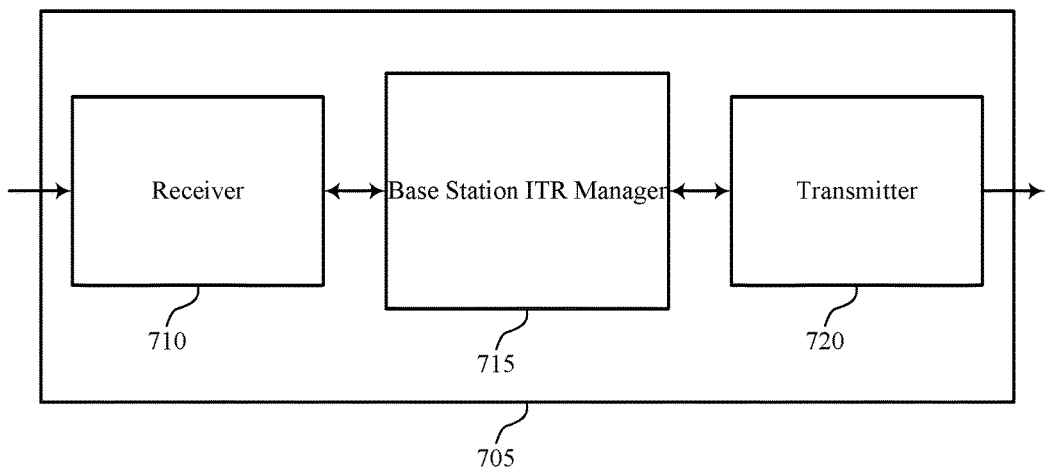
FIGS. 7 through 9 show block diagrams of a device that supports puncture recovery and resource reclaiming for multi-priority scheduling in accordance with aspects of the present disclosure.

FIG. 7 shows a block diagram 700 of a wireless device 705 that supports puncture recovery and resource reclaiming for multi-priority scheduling in accordance with various aspects of the present disclosure. Wireless device 705 may be an example of aspects of a base station 105 as described with reference to FIG. 1. Wireless device 705 may include receiver 710, base station ITR manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to puncture recovery and resource reclaiming for multi-priority scheduling, etc.). Information may be passed on to other components of the device. The receiver 710 may be an example of aspects of the transceiver 1035 described with reference to FIG. 10.

Base station ITR manager 715 may be an example of aspects of the base station ITR manager 1015 described with reference to FIG. 10. Base station ITR manager 715 may identify a first service for transmission of first service data to a UE during a first TTI, identify a second service having a second TTI that is shorter than the first TTI for transmitting second service data, transmit a first transmission of the first service to the UE during the first TTI, puncture a first portion of the first transmission with a second transmission of the second service, a duration of the first portion corresponding to the second TTI, and transmit the first portion of the first transmission to the UE during a subsequent portion of the first TTI.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
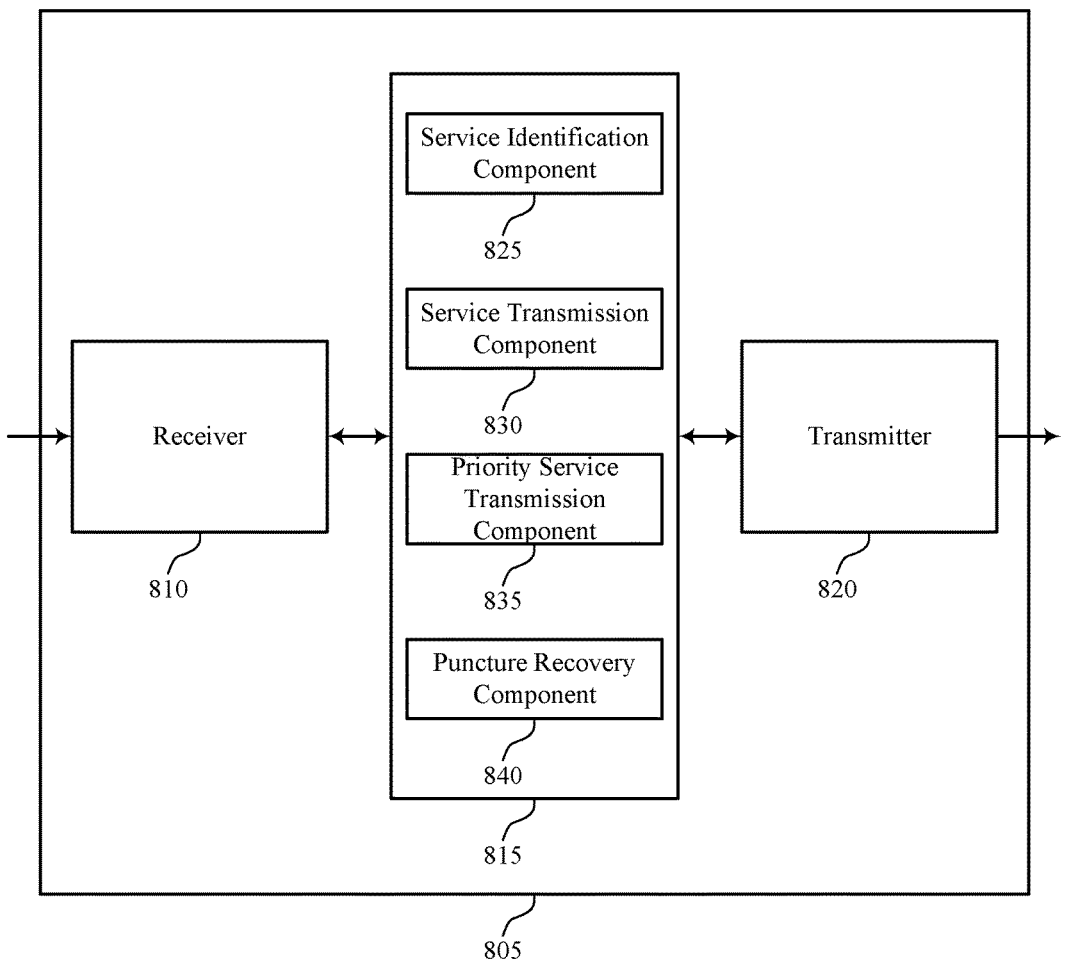

FIG. 8 shows a block diagram 800 of a wireless device 805 that supports puncture recovery and resource reclaiming for multi-priority scheduling in accordance with various aspects of the present disclosure. Wireless device 805 may be an example of aspects of a wireless device 705 or a base station 105 as described with reference to FIGS. 1 and 7. Wireless device 805 may include receiver 810, base station ITR manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to puncture recovery and resource reclaiming for multi-priority scheduling, etc.). Information may be passed on to other components of the device. The receiver 810 may be an example of aspects of the transceiver 1035 described with reference to FIG. 10.

Base station ITR manager 815 may be an example of aspects of the base station ITR manager 1015 described with reference to FIG. 10. Base station ITR manager 815 may also include service identification component 825, service transmission component 830, priority service transmission component 835, and puncture recovery component 840.

Service identification component 825 may identify a first service for transmission of first service data to a UE during a first TTI and identify a second service having a second TTI that is shorter than the first TTI for transmitting second service data. Service transmission component 830 may manage transmission of a first transmission of the first service to the UE during the first TTI. Priority service transmission component 835 may puncture a first portion of the first transmission with a second transmission of the second service, a duration of the first portion corresponding to the second TTI.

Puncture recovery component 840 may transmit the first portion of the first transmission to the UE during a subsequent portion of the first TTI. In some cases, puncture recovery component 840 may determine whether a second resource originally unallocated to the UE is available for transmitting the first portion of the first transmission to the UE during the subsequent portion of the first TTI, and the transmitting the first portion of the first transmission to the UE during the subsequent portion of the first TTI is performed responsive to determining that the second resource is available. In some cases, the first portion of the first TTI is transmitted during the subsequent portion of the first TTI concurrently with a second portion of the first transmission that is transmitted in the subsequent portion of the first TTI.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
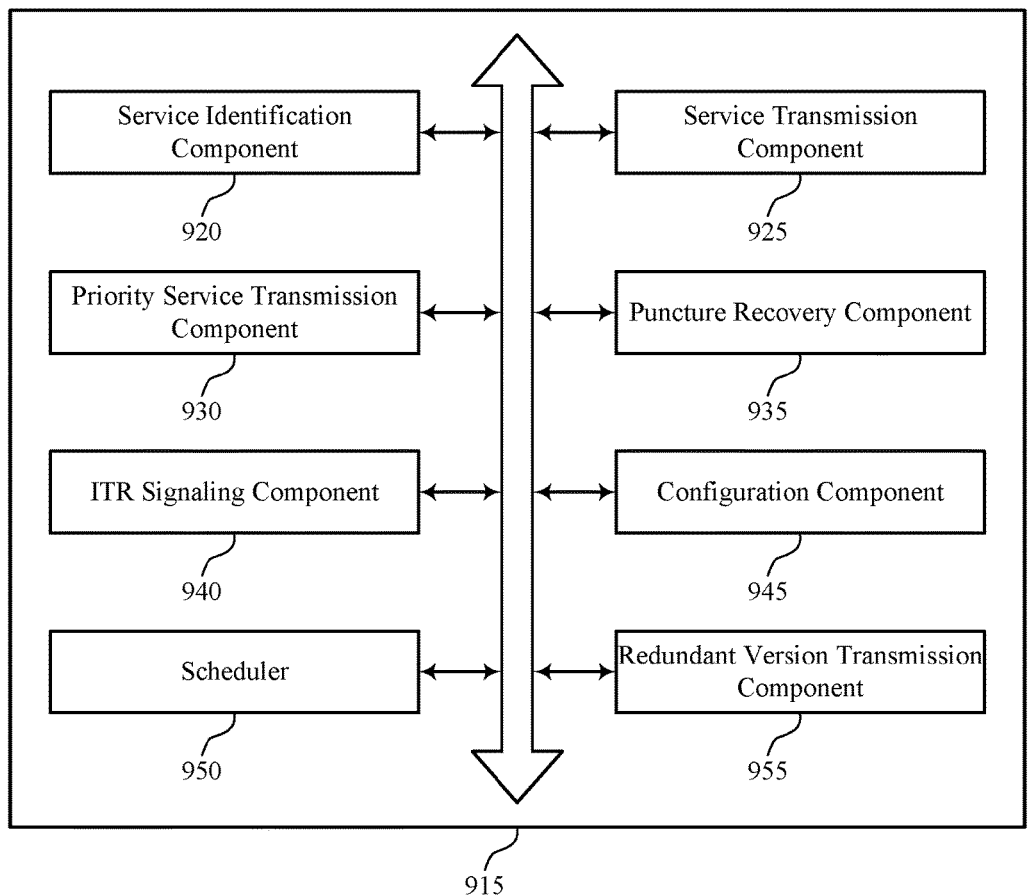

FIG. 9 shows a block diagram 900 of a base station ITR manager 915 that supports puncture recovery and resource reclaiming for multi-priority scheduling in accordance with various aspects of the present disclosure. The base station ITR manager 915 may be an example of aspects of a base station ITR manager 715, a base station ITR manager 815, or a base station ITR manager 1015 described with reference to FIGS. 7, 8, and 10. The base station ITR manager 915 may include service identification component 920, service transmission component 925, priority service transmission component 930, puncture recovery component 935, ITR signaling component 940, configuration component 945, scheduler 950, and redundant version transmission component 955. Each of these modules may communicate, directly or indirectly, with one another (e.g., via one or more buses).

Service identification component 920 may identify a first service for transmission of first service data to a UE during a first TTI and identify a second service having a second TTI that is shorter than the first TTI for transmitting second service data. Service transmission component 925 may transmit a first transmission of the first service to the UE during the first TTI. Priority service transmission component 930 may puncture a first portion of the first transmission with a second transmission of the second service, a duration of the first portion corresponding to the second TTI.

Puncture recovery component 935 may transmit the first portion of the first transmission to the UE during a subsequent portion of the first TTI. In some cases, puncture recovery component 935 may determine whether a second resource originally unallocated to the UE is available for transmitting the first portion of the first transmission to the UE during the subsequent portion of the first TTI, and the transmitting the first portion of the first transmission to the UE during the subsequent portion of the first TTI is performed responsive to determining that the second resource is available. In some cases, the first portion of the first TTI is transmitted during the subsequent portion of the first TTI concurrently with a second portion of the first transmission that is transmitted in the subsequent portion of the first TTI.

ITR signaling component 940 may signal to the UE, during the subsequent portion of the first TTI, that the first portion of the first transmission is being transmitted. In some cease, the ITR signaling component 940 may provide an indication to the UE that a redundant transmission is to be used as a redundancy version of a second portion of the first transmission transmitted using originally allocated resources of the first transmission. In some cases, the ITR signaling includes a SPI channel transmission to the UE that indicates to the UE that the first portion of the first transmission is being transmitted in the subsequent portion of the first TTI. In some cases, the SPI channel transmission includes a temporary identifier that is transmitted in an assigned resource of the first transmission to the UE and in a second resource originally unallocated to the UE. In some cases, the SPI channel transmission includes an identifier selected from a pre-defined set of SPI values and indicated to the UE on the SPI channel and the originally allocated resources. In some cases, e.g., when the UE is an only UE receiving transmissions of the first service during the first TTI, the signaling may include an identifier of the first service in an assigned resource of the first transmission to the UE and in a second resource originally unallocated to the UE. In some cases, e.g., when at least one other UE is receiving transmissions of the first service during the first TTI, an indication may be provided in DCI provided to the UE that the first portion of the first transmission that was punctured is being transmitted to the UE in the second resource.

Configuration component 945 may configure the UE to monitor the second resource when a transmission is punctured and configure the UE to buffer transmissions in the reserved set of resources.

Scheduler 950 may reserve a set of resources for transmission of punctured portions of transmissions of the first service, and where the first portion of the first transmission is transmitted using a subset of the reserved set of resources during the subsequent portion of the first TTI. In some cases, the reserving is performed based on one or more of a buffer status for data transmissions of the first service, a number of UEs scheduled for transmissions during the first TTI, a likelihood of puncturing of the first service, or any combination thereof. Redundant version transmission component 955 may transmit a redundant transmission of a second portion of the first transmission using the reserved set of resources during the second portion of the first transmission.

Figure 10:
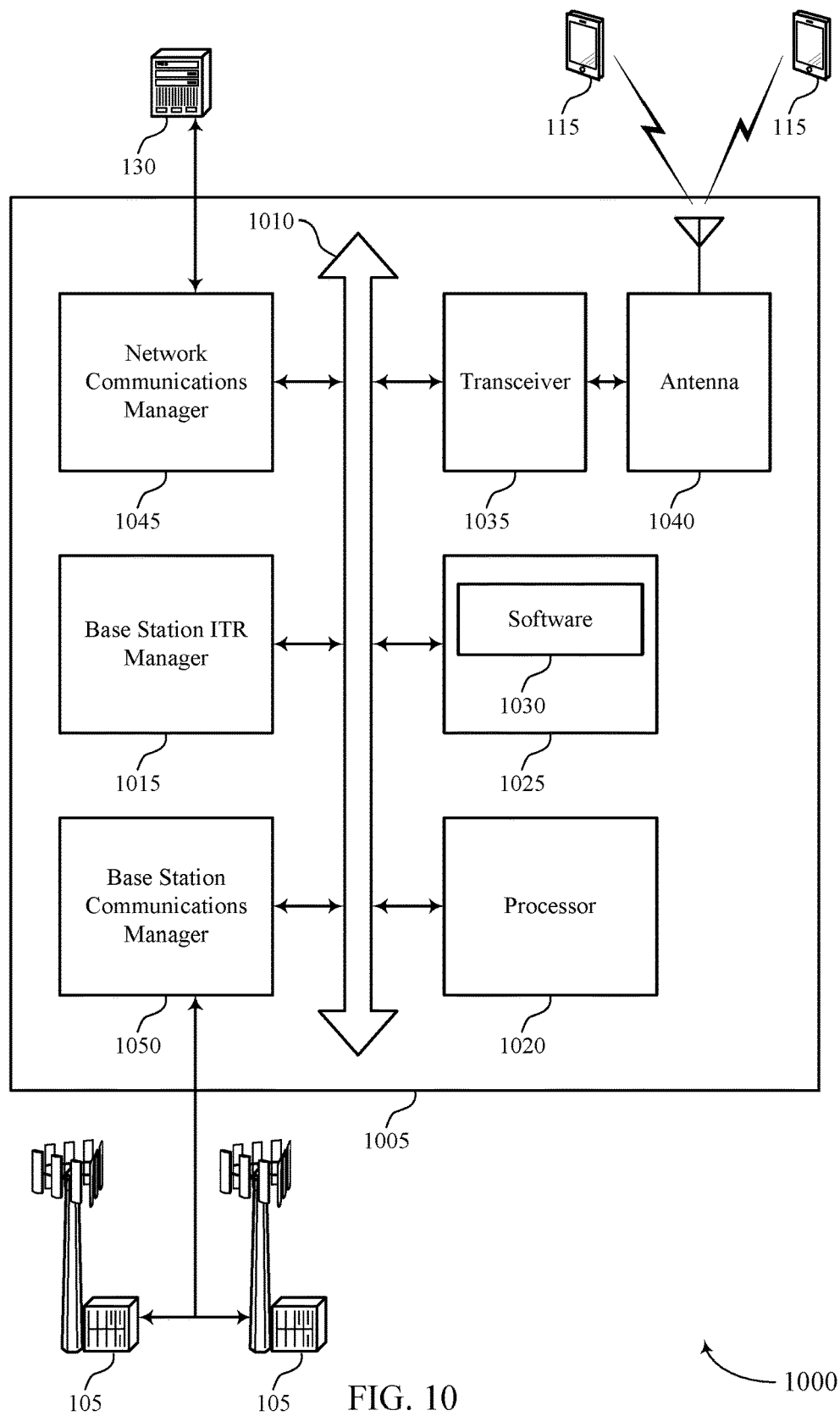
FIG. 10 illustrates a block diagram of a system including a base station that supports puncture recovery and resource reclaiming for multi-priority scheduling in accordance with aspects of the present disclosure.

FIG. 10 shows a diagram of a system 1000 including a device 1005 that supports puncture recovery and resource reclaiming for multi-priority scheduling in accordance with various aspects of the present disclosure. Device 1005 may be an example of or include the components of wireless device 705, wireless device 805, or a base station 105 as described above, e.g., with reference to FIGS. 1, 7 and 8. Device 1005 may include components for bi-directional voice and data communications including components for transmitting and receiving communications, including base station ITR manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting puncture recovery and resource reclaiming for multi-priority scheduling).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support puncture recovery and resource reclaiming for multi-priority scheduling. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an Long Term Evolution (LTE)/LTE-A wireless communication network technology to provide communication between base stations 105.

Figure 11:
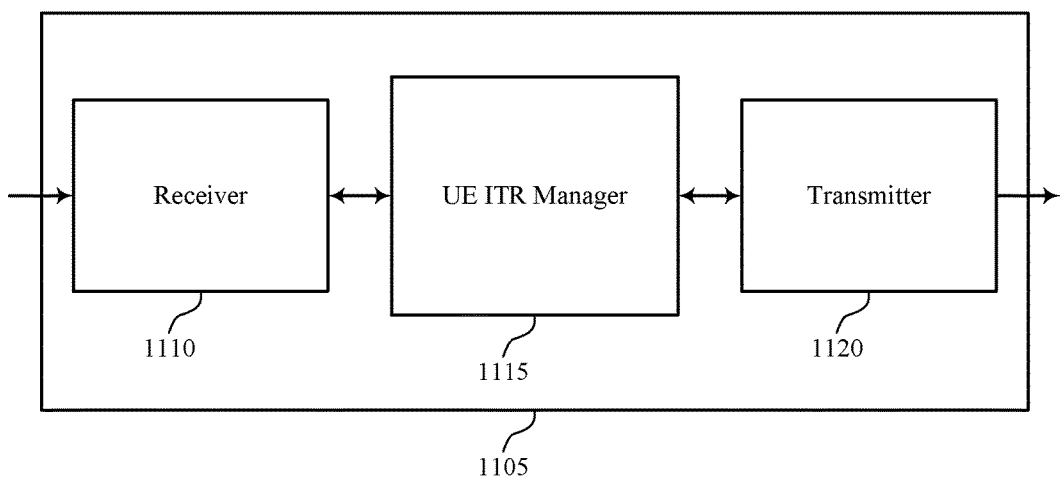
FIGS. 11 through 13 show block diagrams of a device that supports puncture recovery and resource reclaiming for multi-priority scheduling in accordance with aspects of the present disclosure.

FIG. 11 shows a block diagram 1100 of a wireless device 1105 that supports puncture recovery and resource reclaiming for multi-priority scheduling in accordance with various aspects of the present disclosure. Wireless device 1105 may be an example of aspects of a UE 115 as described with reference to FIG. 1. Wireless device 1105 may include receiver 1110, UE ITR manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to puncture recovery and resource reclaiming for multi-priority scheduling, etc.). Information may be passed on to other components of the device. The receiver 1110 may be an example of aspects of the transceiver 1435 described with reference to FIG. 14.

UE ITR manager 1115 may be an example of aspects of the UE ITR manager 1415 described with reference to FIG. 14. UE ITR manager 1115 may receive, from a base station, a downlink allocation for a first service during a first TTI, determine that a priority indication channel is to be monitored on a periodic basis that corresponds to a second TTI duration of a second service, the second TTI duration being shorter than the first TTI, receive a first transmission of the first service during the first TTI, determine that the priority indication channel indicates that the first transmission is being punctured by a second transmission of the second service, a first punctured portion of the first TTI having a duration corresponding to the second TTI duration, discard transmissions received during the first punctured portion of the first TTI, and receive the first punctured portion of the first transmission during a subsequent portion of the first TTI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
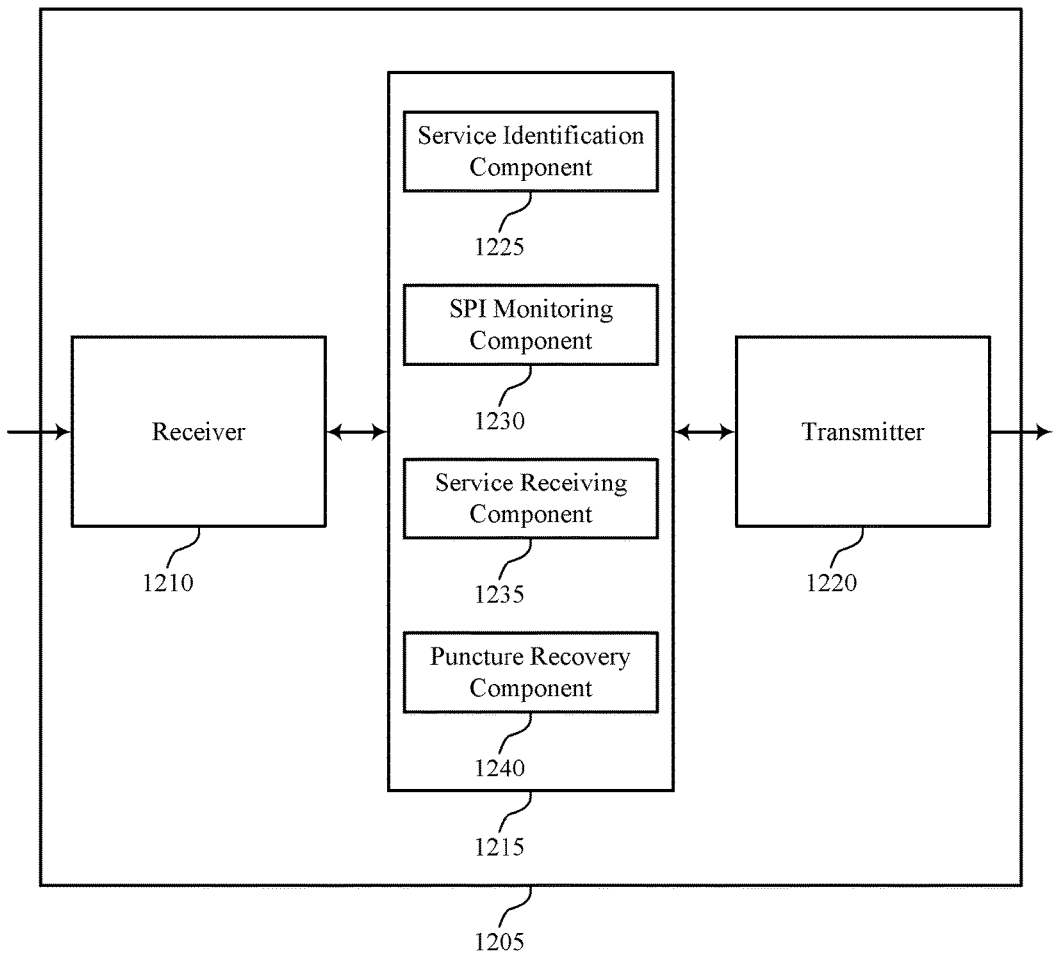

FIG. 12 shows a block diagram 1200 of a wireless device 1205 that supports puncture recovery and resource reclaiming for multi-priority scheduling in accordance with various aspects of the present disclosure. Wireless device 1205 may be an example of aspects of a wireless device 1105 or a UE 115 as described with reference to FIGS. 1 and 11. Wireless device 1205 may include receiver 1210, UE ITR manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to puncture recovery and resource reclaiming for multi-priority scheduling, etc.). Information may be passed on to other components of the device. The receiver 1210 may be an example of aspects of the transceiver 1435 described with reference to FIG. 14.

UE ITR manager 1215 may be an example of aspects of the UE ITR manager 1415 described with reference to FIG. 14. UE ITR manager 1215 may also include service identification component 1225, SPI monitoring component 1230, service receiving component 1235, and puncture recovery component 1240.

Service identification component 1225 may receive, from a base station, a downlink allocation for a first service during a first TTI. SPI monitoring component 1230 may determine that a priority indication channel is to be monitored on a periodic basis that corresponds to a second TTI duration of a second service, the second TTI duration being shorter than the first TTI and determine that the priority indication channel indicates that the first transmission is being punctured by a second transmission of the second service, a first punctured portion of the first TTI having a duration corresponding to the second TTI duration. In some cases, the receiving the first punctured portion of the first transmission during the subsequent portion of the first TTI includes receiving signaling, during the subsequent portion of the first TTI, that indicates the first punctured portion of the first transmission is being transmitted. In some cases, the signaling includes a SPI channel transmission that indicates that the first punctured portion of the first transmission is being transmitted in the subsequent portion of the first TTI. In some cases, the SPI channel transmission includes a temporary identifier that is received in an assigned resource of the first transmission and in a second resource that was previously unallocated for the first transmission. In some cases, the SPI channel transmission includes an identifier selected from a pre-defined set of SPI values and indicated to the UE on the SPI channel.

Service receiving component 1235 may receive a first transmission of the first service during the first TTI, and discard transmissions received during the first punctured portion of the first TTI. In some cases, service receiving component 1235 may buffer transmissions in the reserved set of resources. In some cases, the first punctured portion of the first transmission is received during the subsequent portion of the first TTI concurrently with a second portion of the first transmission that is received in the subsequent portion of the first TTI. In some cases, the signaling includes an identifier of the first service in an allocated resource of the first transmission and in a second unallocated resource, or an indication in DCI that the first punctured portion of the first transmission is being transmitted in the second unallocated resource. Puncture recovery component 1240 may receive the first punctured portion of the first transmission during a subsequent portion of the first TTI.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
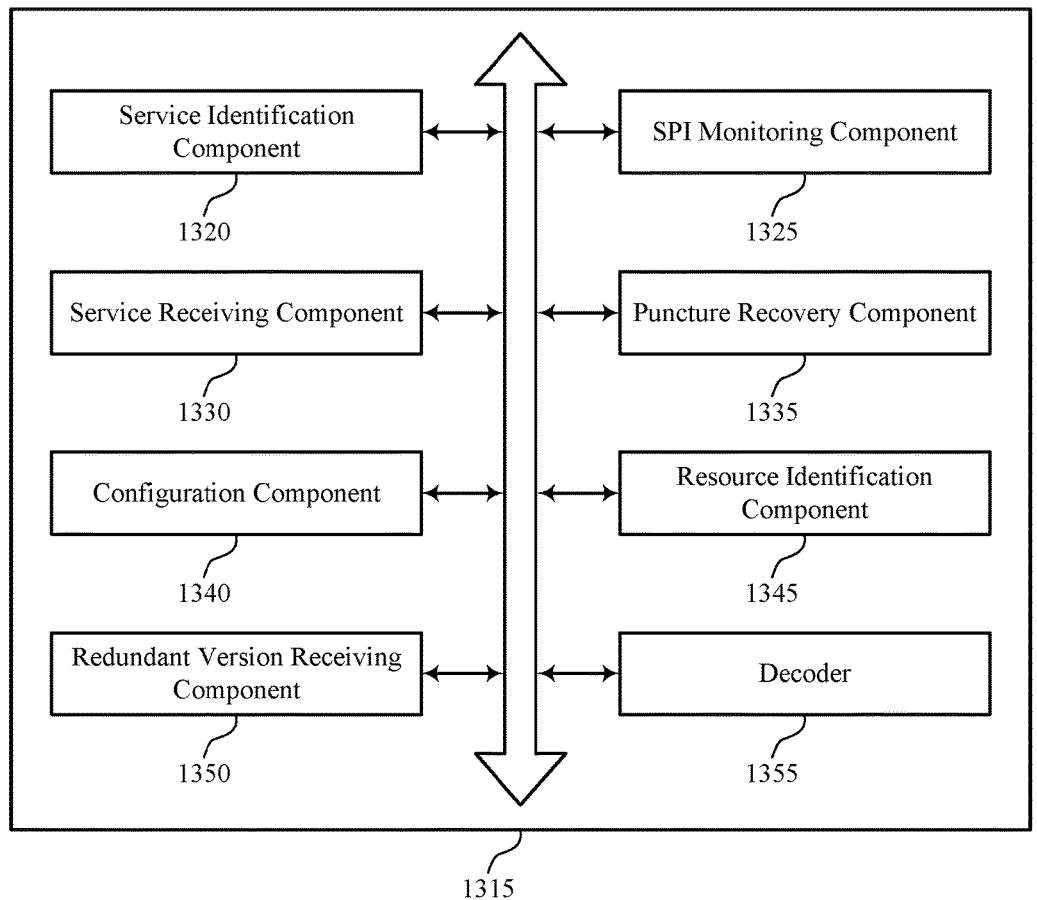

FIG. 13 shows a block diagram 1300 of a UE ITR manager 1315 that supports puncture recovery and resource reclaiming for multi-priority scheduling in accordance with various aspects of the present disclosure. The UE ITR manager 1315 may be an example of aspects of a UE ITR manager 1415 described with reference to FIGS. 11, 12, and 14. The UE ITR manager 1315 may include service identification component 1320, SPI monitoring component 1325, service receiving component 1330, puncture recovery component 1335, configuration component 1340, resource identification component 1345, redundant version receiving component 1350, and decoder 1355. Each of these modules may communicate, directly or indirectly, with one another (e.g., via one or more buses).

Service identification component 1320 may receive, from a base station, a downlink allocation for a first service during a first TTI. SPI monitoring component 1325 may determine that a priority indication channel is to be monitored on a periodic basis that corresponds to a second TTI duration of a second service, the second TTI duration being shorter than the first TTI and determine that the priority indication channel indicates that the first transmission is being punctured by a second transmission of the second service, a first punctured portion of the first TTI having a duration corresponding to the second TTI duration. In some cases, the receiving the first punctured portion of the first transmission during the subsequent portion of the first TTI includes receiving signaling, during the subsequent portion of the first TTI, that indicates the first punctured portion of the first transmission is being transmitted. In some cases, the signaling includes a SPI channel transmission that indicates that the first punctured portion of the first transmission is being transmitted in the subsequent portion of the first TTI. In some cases, the SPI channel transmission includes a temporary identifier that is received in an assigned resource of the first transmission and in a second resource that was previously unallocated for the first transmission. In some cases, the SPI channel transmission includes an identifier selected from a pre-defined set of SPI values and indicated to the UE on the SPI channel.

Service receiving component 1330 may receive a first transmission of the first service during the first TTI, and discard transmissions received during the first punctured portion of the first TTI. In some cases, service receiving component 1330 may buffer transmissions in the reserved set of resources. In some cases, the first punctured portion of the first transmission is received during the subsequent portion of the first TTI concurrently with a second portion of the first transmission that is received in the subsequent portion of the first TTI. In some cases, the signaling includes an identifier of the first service in an allocated resource of the first transmission and in a second unallocated resource, or an indication in DCI that the first punctured portion of the first transmission is being transmitted in the second unallocated resource.

Puncture recovery component 1335 may receive the first punctured portion of the first transmission during a subsequent portion of the first TTI. Configuration component 1340 may receive a configuration to monitor the second resource when a transmission is punctured. Resource identification component 1345 may receive an identification of a reserved set of resources for transmission of punctured portions of transmissions of the first service, and the first punctured portion of the first transmission may be received using a subset of the reserved set of resources during the subsequent portion of the first TTI concurrently with a second portion of the first transmission that is received using first TTI resources previously allocated to the UE in the subsequent portion of the first TTI.

Redundant version receiving component 1350 may receive an indication that the second portion of the first transmission transmitted using the reserved set of resources is to be used as a redundancy version of the second portion of the first transmission transmitted using originally allocated resources of the first transmission. Decoder 1355 may decode the second portion of the first transmission based on a received transmission in the originally allocated resources and the redundancy version of the second portion of the first transmission received in the reserved set of resources.

Figure 14:
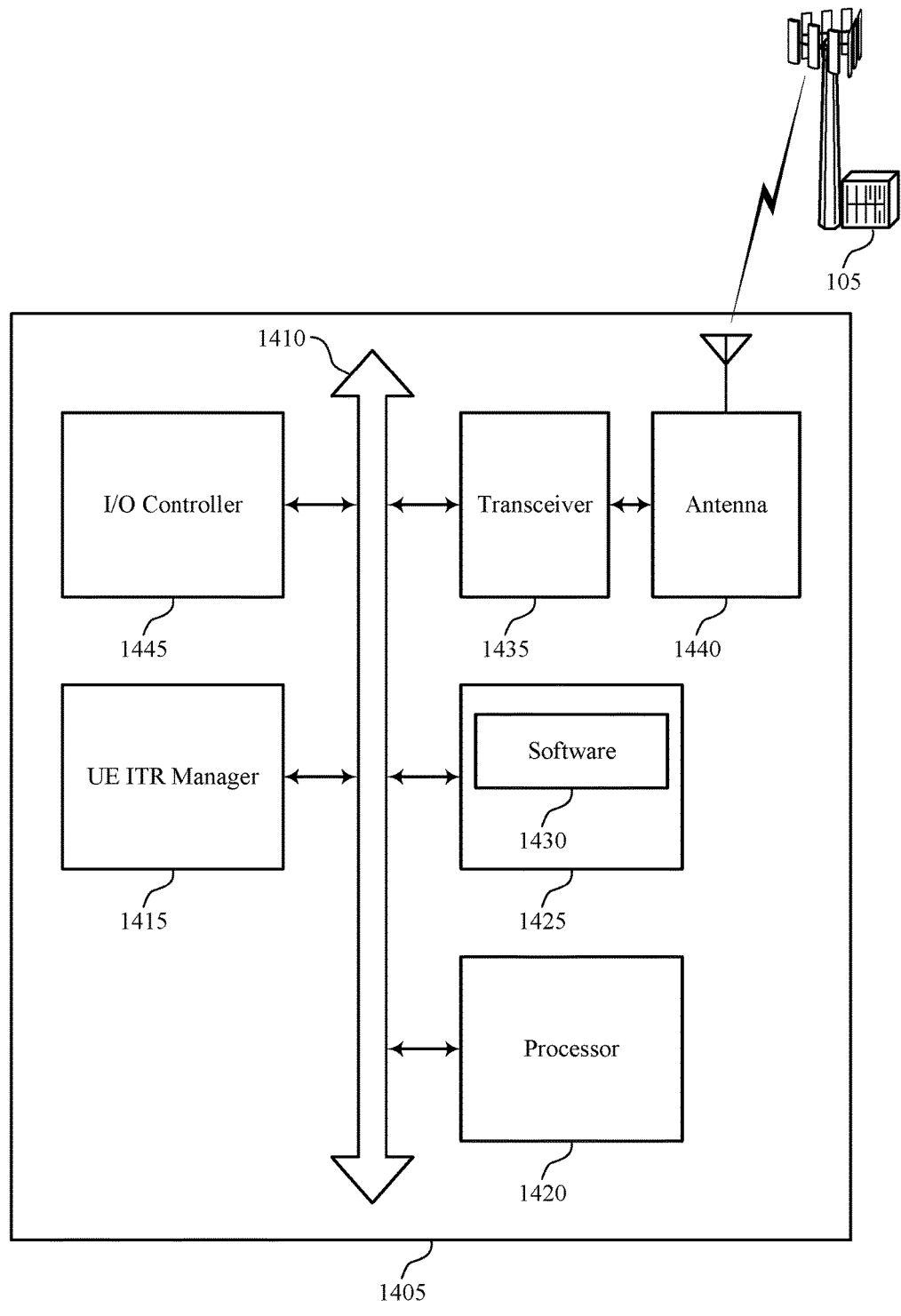
FIG. 14 illustrates a block diagram of a system including a UE that supports puncture recovery and resource reclaiming for multi-priority scheduling in accordance with aspects of the present disclosure.

FIG. 14 shows a diagram of a system 1400 including a device 1405 that supports puncture recovery and resource reclaiming for multi-priority scheduling in accordance with various aspects of the present disclosure. Device 1405 may be an example of or include the components of UE 115 as described above, e.g., with reference to FIG. 1. Device 1405 may include components for bi-directional voice and data communications including components for transmitting and receiving communications, including UE ITR manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting puncture recovery and resource reclaiming for multi-priority scheduling).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support puncture recovery and resource reclaiming for multi-priority scheduling. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
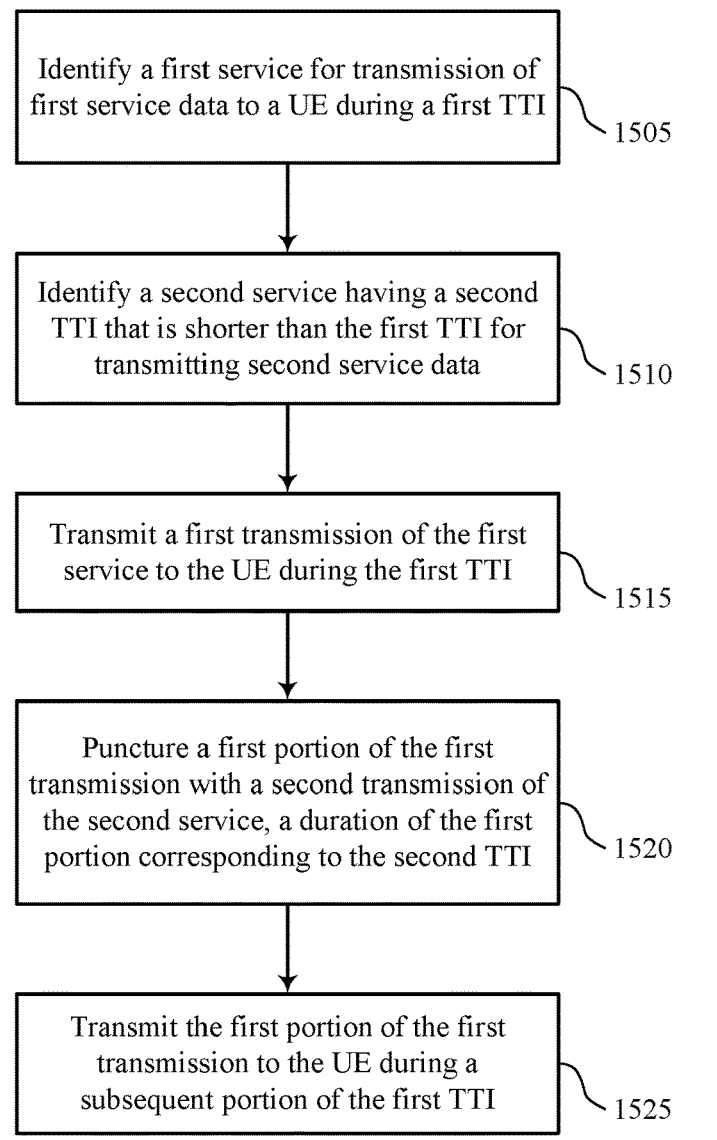
FIGS. 15 through 19 illustrate methods for puncture recovery and resource reclaiming for multi-priority scheduling in accordance with aspects of the present disclosure.

FIG. 15 shows a flowchart illustrating a method 1500 for puncture recovery and resource reclaiming for multi-priority scheduling in accordance with various aspects of the present disclosure. The operations of method 1500 may be implemented by a base station 105 or its components as described herein. For example, the operations of method 1500 may be performed by a base station ITR manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may identify a first service for transmission of first service data to a UE during a first transmission time interval (TTI). The operations of block 1505 may be performed according to the methods described with reference to FIGS. 1 through 6. In certain examples, aspects of the operations of block 1505 may be performed by a service identification component as described with reference to FIGS. 7 through 10.

At block 1510 the base station 105 may identify a second service having a second TTI that is shorter than the first TTI for transmitting second service data. The operations of block 1510 may be performed according to the methods described with reference to FIGS. 1 through 6. In certain examples, aspects of the operations of block 1510 may be performed by a service identification component as described with reference to FIGS. 7 through 10.

At block 1515 the base station 105 may transmit a first transmission of the first service to the UE during the first TTI. The operations of block 1515 may be performed according to the methods described with reference to FIGS. 1 through 6. In certain examples, aspects of the operations of block 1515 may be performed by a service transmission component as described with reference to FIGS. 7 through 10.

At block 1520 the base station 105 may puncture a first portion of the first transmission with a second transmission of the second service, a duration of the first portion corresponding to the second TTI. The operations of block 1520 may be performed according to the methods described with reference to FIGS. 1 through 6. In certain examples, aspects of the operations of block 1520 may be performed by a priority service transmission component as described with reference to FIGS. 7 through 10.

At block 1525 the base station 105 may transmit the first portion of the first transmission to the UE during a subsequent portion of the first TTI. The operations of block 1525 may be performed according to the methods described with reference to FIGS. 1 through 6. In certain examples, aspects of the operations of block 1525 may be performed by a puncture recovery component as described with reference to FIGS. 7 through 10.

Figure 16:
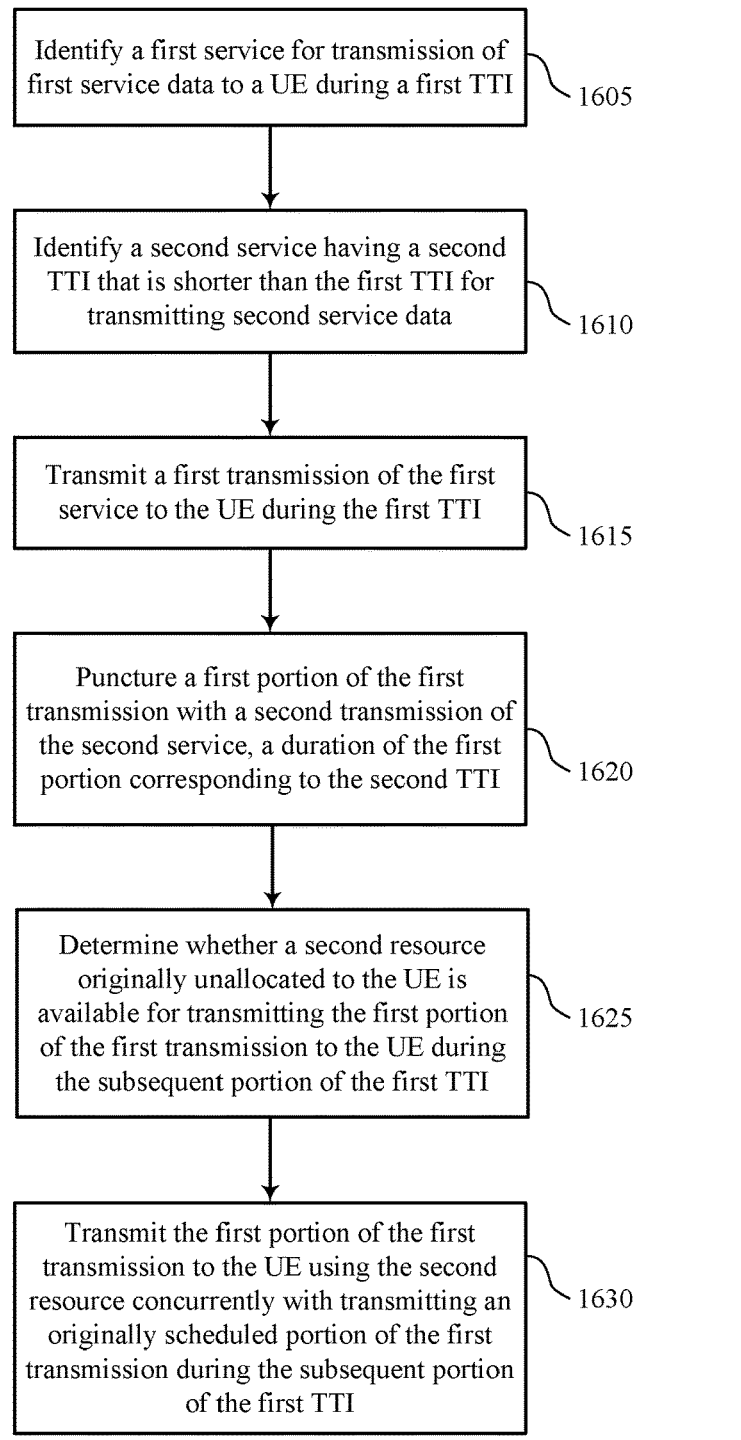

FIG. 16 shows a flowchart illustrating a method 1600 for puncture recovery and resource reclaiming for multi-priority scheduling in accordance with various aspects of the present disclosure. The operations of method 1600 may be implemented by a base station 105 or its components as described herein. For example, the operations of method 1600 may be performed by a base station ITR manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may identify a first service for transmission of first service data to a UE during a first transmission time interval (TTI). The operations of block 1605 may be performed according to the methods described with reference to FIGS. 1 through 6. In certain examples, aspects of the operations of block 1605 may be performed by a service identification component as described with reference to FIGS. 7 through 10.

At block 1610 the base station 105 may identify a second service having a second TTI that is shorter than the first TTI for transmitting second service data. The operations of block 1610 may be performed according to the methods described with reference to FIGS. 1 through 6. In certain examples, aspects of the operations of block 1610 may be performed by a service identification component as described with reference to FIGS. 7 through 10.

At block 1615 the base station 105 may transmit a first transmission of the first service to the UE during the first TTI. The operations of block 1615 may be performed according to the methods described with reference to FIGS. 1 through 6. In certain examples, aspects of the operations of block 1615 may be performed by a service transmission component as described with reference to FIGS. 7 through 10.

At block 1620 the base station 105 may puncture a first portion of the first transmission with a second transmission of the second service, a duration of the first portion corresponding to the second TTI. The operations of block 1620 may be performed according to the methods described with reference to FIGS. 1 through 6. In certain examples, aspects of the operations of block 1620 may be performed by a priority service transmission component as described with reference to FIGS. 7 through 10.

At block 1625 the base station 105 may determine whether a second resource originally unallocated to the UE is available for transmitting the first portion of the first transmission to the UE during the subsequent portion of the first TTI. The operations of block 1625 may be performed according to the methods described with reference to FIGS. 1 through 6. In certain examples, aspects of the operations of block 1625 may be performed by a puncture recovery component as described with reference to FIGS. 7 through 10.

At block 1630 the base station 105 may transmit the first portion of the first transmission to the UE using the second resource concurrently with transmitting an originally scheduled portion of the first transmission during the subsequent portion of the first TTI. The operations of block 1630 may be performed according to the methods described with reference to FIGS. 1 through 6. In certain examples, aspects of the operations of block 1630 may be performed by a puncture recovery component as described with reference to FIGS. 7 through 10.

Figure 17:
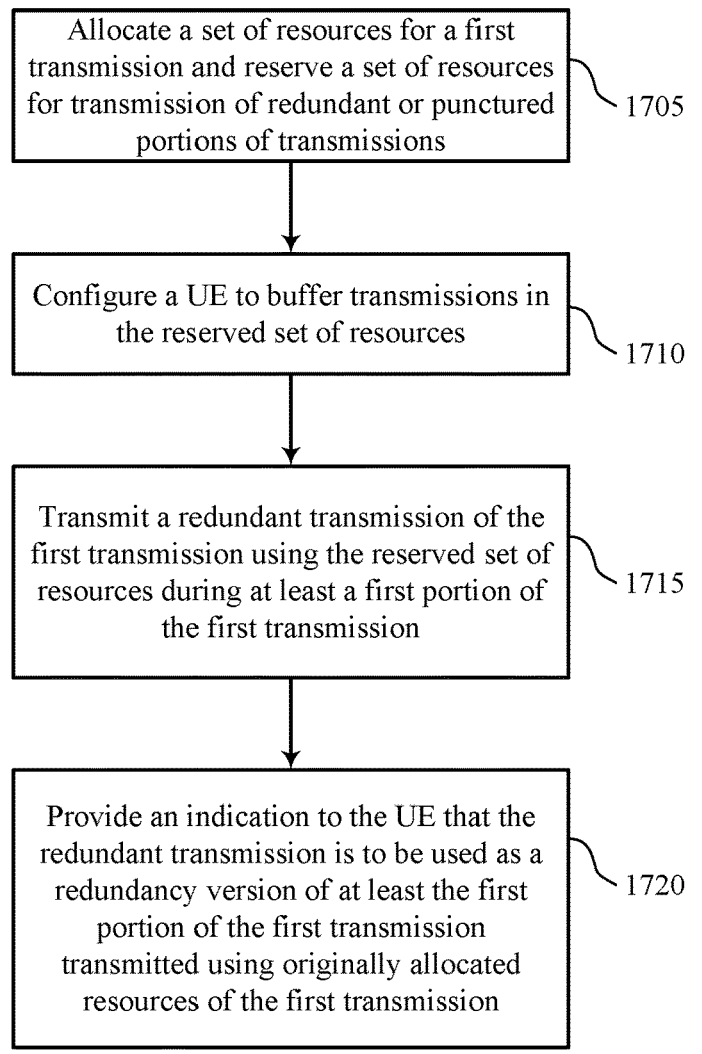

FIG. 17 shows a flowchart illustrating a method 1700 for puncture recovery and resource reclaiming for multi-priority scheduling in accordance with various aspects of the present disclosure. The operations of method 1700 may be implemented by a base station 105 or its components as described herein. For example, the operations of method 1700 may be performed by a base station ITR manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may allocate a set of resources for a first transmission and reserve a set of resources for transmission of punctured portions of transmissions. The operations of block 1705 may be performed according to the methods described with reference to FIGS. 1 through 6. In certain examples, aspects of the operations of block 1705 may be performed by a scheduler as described with reference to FIGS. 7 through 10.

At block 1710 the base station 105 may configure the UE to buffer transmissions in the reserved set of resources. The operations of block 1710 may be performed according to the methods described with reference to FIGS. 1 through 6. In certain examples, aspects of the operations of block 1710 may be performed by a configuration component as described with reference to FIGS. 7 through 10.

At block 1715 the base station 105 may transmit a redundant transmission of a second portion of the first transmission using the reserved set of resources during the second portion of the first transmission. The operations of block 1715 may be performed according to the methods described with reference to FIGS. 1 through 6. In certain examples, aspects of the operations of block 1715 may be performed by a redundant version transmission component as described with reference to FIGS. 7 through 10.

At block 1720 the base station 105 may provide an indication to the UE that the redundant transmission is to be used as a redundancy version of the second portion of the first transmission transmitted using originally allocated resources of the first transmission. The operations of block 1720 may be performed according to the methods described with reference to FIGS. 1 through 6. In certain examples, aspects of the operations of block 1720 may be performed by a ITR signaling component as described with reference to FIGS. 7 through 10.

Figure 18:
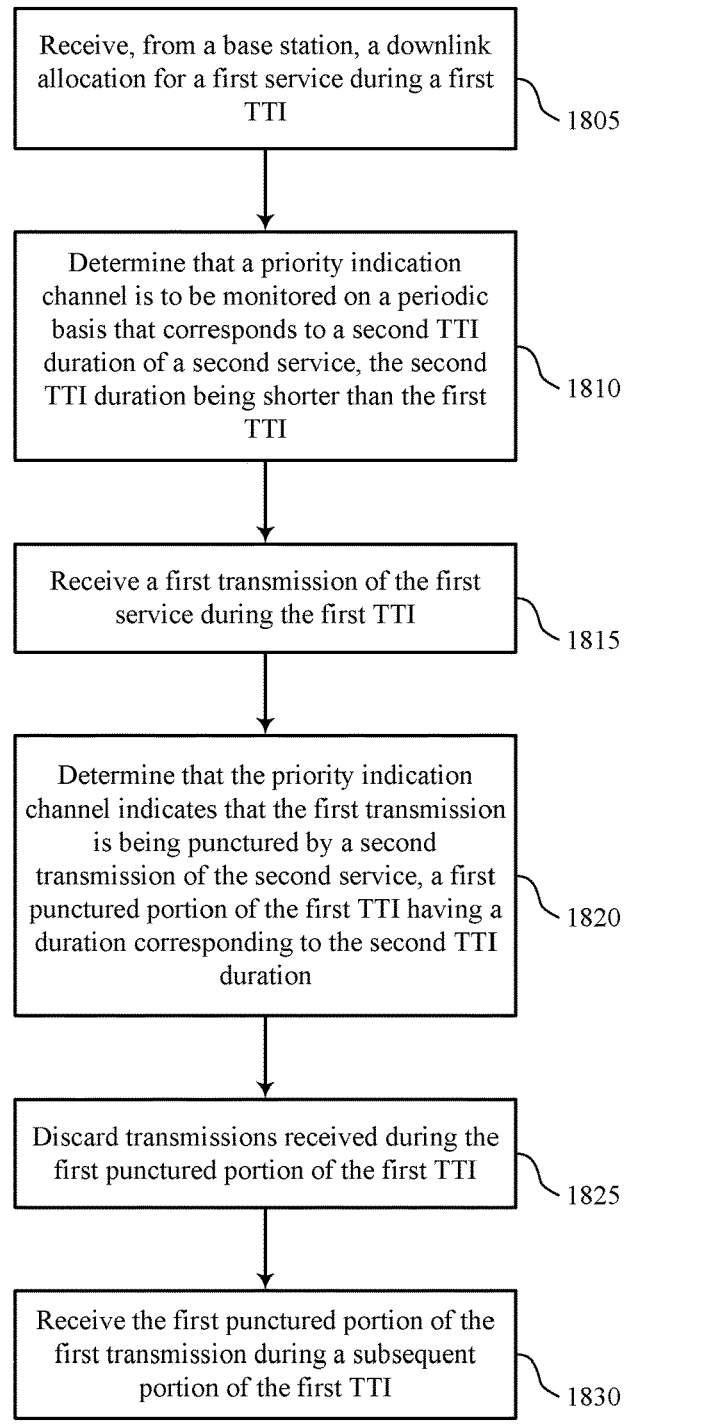

FIG. 18 shows a flowchart illustrating a method 1800 for puncture recovery and resource reclaiming for multi-priority scheduling in accordance with various aspects of the present disclosure. The operations of method 1800 may be implemented by a UE 115 or its components as described herein. For example, the operations of method 1800 may be performed by a UE ITR manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive, from a base station, a downlink allocation for a first service during a first transmission time interval (TTI). The operations of block 1805 may be performed according to the methods described with reference to FIGS. 1 through 6. In certain examples, aspects of the operations of block 1805 may be performed by a service identification component as described with reference to FIGS. 11 through 14.

At block 1810 the UE 115 may determine that a priority indication channel is to be monitored on a periodic basis that corresponds to a second TTI duration of a second service, the second TTI duration being shorter than the first TTI. The operations of block 1810 may be performed according to the methods described with reference to FIGS. 1 through 6. In certain examples, aspects of the operations of block 1810 may be performed by a SPI monitoring component as described with reference to FIGS. 11 through 14.

At block 1815 the UE 115 may receive a first transmission of the first service during the first TTI. The operations of block 1815 may be performed according to the methods described with reference to FIGS. 1 through 6. In certain examples, aspects of the operations of block 1815 may be performed by a service receiving component as described with reference to FIGS. 11 through 14.

At block 1820 the UE 115 may determine that the priority indication channel indicates that the first transmission is being punctured by a second transmission of the second service, a first punctured portion of the first TTI having a duration corresponding to the second TTI duration. The operations of block 1820 may be performed according to the methods described with reference to FIGS. 1 through 6. In certain examples, aspects of the operations of block 1820 may be performed by a SPI monitoring component as described with reference to FIGS. 11 through 14.

At block 1825 the UE 115 may discard transmissions received during the first punctured portion of the first TTI. The operations of block 1825 may be performed according to the methods described with reference to FIGS. 1 through 6. In certain examples, aspects of the operations of block 1825 may be performed by a service receiving component as described with reference to FIGS. 11 through 14.

At block 1830 the UE 115 may receive the first punctured portion of the first transmission during a subsequent portion of the first TTI. The operations of block 1830 may be performed according to the methods described with reference to FIGS. 1 through 6. In certain examples, aspects of the operations of block 1830 may be performed by a puncture recovery component as described with reference to FIGS. 11 through 14.

Figure 19:
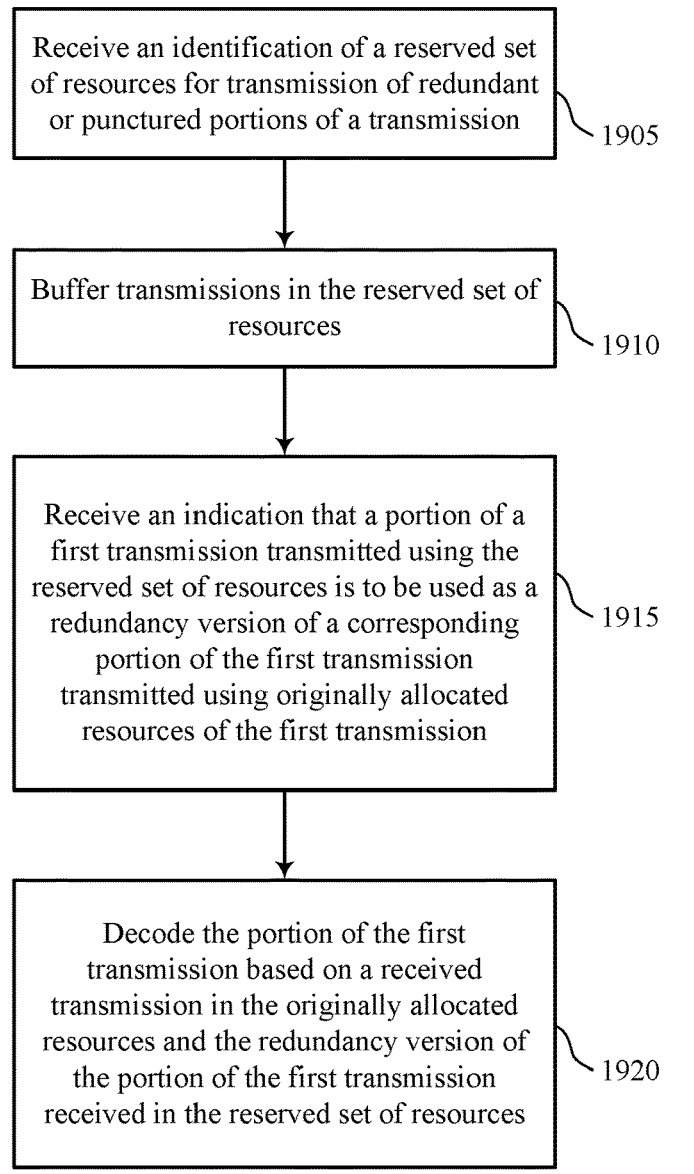

FIG. 19 shows a flowchart illustrating a method 1900 for puncture recovery and resource reclaiming for multi-priority scheduling in accordance with various aspects of the present disclosure. The operations of method 1900 may be implemented by a UE 115 or its components as described herein. For example, the operations of method 1900 may be performed by a UE ITR manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may receive, from a base station, a downlink allocation for a first service during a first transmission time interval (TTI). The operations of block 1905 may be performed according to the methods described with reference to FIGS. 1 through 6. In certain examples, aspects of the operations of block 1905 may be performed by a service identification component as described with reference to FIGS. 11 through 14.

At block 1905 the UE 115 may receive an identification of a reserved set of resources for transmission of redundant or punctured portions of transmissions. The operations of block 1905 may be performed according to the methods described with reference to FIGS. 1 through 6. In certain examples, aspects of the operations of block 1905 may be performed by a resource identification component as described with reference to FIGS. 11 through 14.

At block 1910 the UE 115 may buffer transmissions in the reserved set of resources. The operations of block 1910 may be performed according to the methods described with reference to FIGS. 1 through 6. In certain examples, aspects of the operations of block 1910 may be performed by a service receiving component as described with reference to FIGS. 11 through 14.

At block 1915 the UE 115 may receive an indication that the second portion of the first transmission transmitted using the reserved set of resources is to be used as a redundancy version of the second portion of the first transmission transmitted using originally allocated resources of the first transmission. The operations of block 1915 may be performed according to the methods described with reference to FIGS. 1 through 6. In certain examples, aspects of the operations of block 1915 may be performed by a redundant version receiving component as described with reference to FIGS. 11 through 14.

At block 1920 the UE 115 may decode the second portion of the first transmission based on a received transmission in the originally allocated resources and the redundancy version of the second portion of the first transmission received in the reserved set of resources. The operations of block 1920 may be performed according to the methods described with reference to FIGS. 1 through 6. In certain examples, aspects of the operations of block 1920 may be performed by a decoder as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a first service for transmission of first service data to a UE during a first transmission time interval (TTI);
    identifying a second service having a second TTI that is shorter than the first TTI for transmitting second service data;
    transmitting a first transmission of the first service to the UE during the first TTI;
    puncturing a first portion of the first transmission with a second transmission of the second service, a duration of the first portion corresponding to the second TTI; and
    transmitting the first portion of the first transmission to the UE during a subsequent portion of the first TTI, wherein the first portion of the first transmission is transmitted during the subsequent portion of the first TTI concurrently with a second portion of the first transmission that is transmitted in the subsequent portion of the first TTI.

2. The method of claim 1, further comprising:
signaling to the UE, during the subsequent portion of the first TTI, that the first portion of the first transmission is being transmitted.

3. The method of claim 2, wherein the signaling comprises:
transmitting a scheduling priority indicator (SPI) channel transmission to the UE that indicates to the UE that the first portion of the first transmission is being transmitted in the subsequent portion of the first TTI.

4. The method of claim 3, wherein the SPI channel transmission comprises an identifier selected from a predefined set of SPI values and indicated to the UE on the SPI channel.

5. The method of claim 3, wherein the SPI channel transmission comprises a temporary identifier that is transmitted in an assigned resource of the first transmission to the UE and in a second resource originally unallocated to the UE.

6. The method of claim 5, further comprising:
configuring the UE to monitor the second resource when a transmission is punctured.

7. The method of claim 2, wherein the signaling comprises:
transmitting an identifier of the first service in an assigned resource of the first transmission to the UE and in a second resource originally unallocated to the UE; or
transmitting an indication in downlink control information (DCI) provided to the UE that the first portion of the first transmission that was punctured is being transmitted to the UE in the second resource.

8. The method of claim 1, further comprising:
determining whether a second resource originally unallocated to the UE is available for transmitting the first portion of the first transmission to the UE during the subsequent portion of the first TTI; and
wherein the transmitting the first portion of the first transmission to the UE during the subsequent portion of the first TTI is performed responsive to determining that the second resource is available for transmitting the first portion of the first transmission during the subsequent portion of the first TTI.

9. The method of claim 1, further comprising:
reserving a set of resources for transmission of punctured portions of transmissions of the first service, and
wherein the first portion of the first transmission is transmitted using a subset of the reserved set of resources during the subsequent portion of the first TTI.

10. The method of claim 9, further comprising:
configuring the UE to buffer transmissions in the reserved set of resources;
transmitting a redundant transmission of a second portion of the first transmission using the reserved set of resources during the second portion of the first transmission; and
providing an indication to the UE that the redundant transmission is to be used as a redundancy version of the second portion of the first transmission transmitted using originally allocated resources of the first transmission.

11. The method of claim 9, wherein the reserving is performed based at least in part on one or more of a buffer status for data transmissions of the first service, a number of UEs scheduled for transmissions during the first TTI, a likelihood of puncturing of the first service, or any combination thereof.

12. A method for wireless communication, comprising:
receiving, from a base station, a downlink allocation for a first service during a first transmission time interval (TTI);
determining that a priority indication channel is to be monitored on a periodic basis that corresponds to a second TTI duration of a second service, the second TTI duration being shorter than the first TTI;
receiving a first transmission of the first service during the first TTI;
determining that the priority indication channel indicates that the first transmission is being punctured by a second transmission of the second service, a first punctured portion of the first TTI having a duration corresponding to the second TTI duration;
discarding transmissions received during the first punctured portion of the first TTI; and
receiving the first punctured portion of the first transmission during a subsequent portion of the first TTI, wherein the first punctured portion of the first transmission is received during the subsequent portion of the first TTI concurrently with a second portion of the first transmission that is received in the subsequent portion of the first TTI.

13. The method of claim 12, wherein the receiving the first punctured portion of the first transmission during the subsequent portion of the first TTI comprises:
receiving signaling, during the subsequent portion of the first TTI, that indicates the first punctured portion of the first transmission is being transmitted.

14. The method of claim 13, wherein the signaling comprises:
an identifier of the first service in an allocated resource of the first transmission and in a second unallocated resource; or
an indication in downlink control information (DCI) that the first punctured portion of the first transmission is being transmitted in the second unallocated resource.

15. The method of claim 13, wherein the signaling comprises a scheduling priority indicator (SPI) channel transmission that indicates that the first punctured portion of the first transmission is being transmitted in the subsequent portion of the first TTI.

16. The method of claim 15, wherein the SPI channel transmission includes an identifier selected from a predefined set of SPI values and indicated on the SPI channel.

17. The method of claim 15, wherein the SPI channel transmission comprises a temporary identifier that is received in an assigned resource of the first transmission and in a second resource that was previously unallocated for the first transmission.

18. The method of claim 17, further comprising:
receiving a configuration to monitor the second resource when a transmission is punctured.

19. The method of claim 12, further comprising:
receiving an identification of a reserved set of resources for transmission of punctured portions of transmissions of the first service, and
wherein the first punctured portion of the first transmission is received using a subset of the reserved set of resources during the subsequent portion of the first TTI concurrently with a second portion of the first transmission that is received using first TTI resources previously allocated in the subsequent portion of the first TTI.

20. The method of claim 19, further comprising:
buffering transmissions in the reserved set of resources;
receiving an indication that the second portion of the first transmission transmitted using the reserved set of resources is to be used as a redundancy version of the second portion of the first transmission transmitted using originally allocated resources of the first transmission; and
decoding the second portion of the first transmission based on a received transmission in the originally allocated resources and the redundancy version of the second portion of the first transmission received in the reserved set of resources.

21. An apparatus for wireless communication, comprising:
means for identifying a first service for transmission of first service data to a UE during a first transmission time interval (TTI);
means for identifying a second service having a second TTI that is shorter than the first TTI for transmitting second service data;
means for transmitting a first transmission of the first service to the UE during the first TTI;
means for puncturing a first portion of the first transmission with a second transmission of the second service, a duration of the first portion corresponding to the second TTI; and
means for transmitting the first portion of the first transmission to the UE during a subsequent portion of the first TTI, wherein the means for transmitting the first portion of the first transmission during the subsequent portion of the first TTI comprise means for transmitting the first portion of the first transmission during the subsequent portion of the first TTI concurrently with a second portion of the first transmission transmitted in the subsequent portion of the first TTI.

22. The apparatus of claim 21, further comprising:
means for signaling to the UE, during the subsequent portion of the first TTI, that the first portion of the first transmission is being transmitted.

23. The apparatus of claim 22, wherein the signaling comprises:
transmitting a scheduling priority indicator (SPI) channel transmission to the UE that indicates to the UE that the first portion of the first transmission is being transmitted in the subsequent portion of the first TTI.

24. The apparatus of claim 23, wherein the SPI channel transmission comprises an identifier selected from a predefined set of SPI values and indicated to the UE on the SPI channel.

25. The apparatus of claim 23, wherein the SPI channel transmission comprises a temporary identifier that is transmitted in an assigned resource of the first transmission to the UE and in a second resource originally unallocated to the UE.

26. The apparatus of claim 25, further comprising:
configuring the UE to monitor the second resource when a transmission is punctured.

27. An apparatus for wireless communication, comprising:
means for receiving, from a base station, a downlink allocation for a first service during a first transmission time interval (TTI);
means for determining that a priority indication channel is to be monitored on a periodic basis that corresponds to a second TTI duration of a second service, the second TTI duration being shorter than the first TTI;
means for receiving a first transmission of the first service during the first TTI;
means for determining that the priority indication channel indicates that the first transmission is being punctured by a second transmission of the second service, a first punctured portion of the first TTI having a duration corresponding to the second TTI duration;
means for discarding transmissions received during the first punctured portion of the first TTI; and
means for receiving the first punctured portion of the first transmission during a subsequent portion of the first TTI, wherein the means for receiving the first punctured portion of the first transmission during the subsequent portion of the first TTI comprise means for receiving the first punctured portion of the first transmission during the subsequent portion of the first TTI concurrently with a second portion of the first transmission received in the subsequent portion of the first TTI.

* * * * *